United States Patent [19]

Sanford et al.

[11] Patent Number: 5,001,751
[45] Date of Patent: Mar. 19, 1991

[54] MODE 4 REPLY DECODER

[75] Inventors: Norman R. Sanford, Cockeysville; William E. Krause, Timonium, both of Md.

[73] Assignee: Allied Signal Inc., Morris Township, Morris County, N.J.

[21] Appl. No.: 335,052

[22] Filed: Apr. 7, 1989

[51] Int. Cl.⁵ .................... H04K 1/00; G01S 7/36
[52] U.S. Cl. ........................... 380/23; 380/48; 342/45; 364/424.01
[58] Field of Search ............ 342/45; 380/23, 48; 364/424

[56] References Cited

U.S. PATENT DOCUMENTS

| | | | |
|---|---|---|---|
| 3,310,802 | 3/1967 | Coleman et al. | 380/48 |
| 4,630,048 | 12/1986 | Callahan, Jr. | 342/45 |
| 4,630,049 | 12/1986 | Callahan, Jr. | 342/45 |
| 4,802,216 | 1/1989 | Irwin et al. | 380/48 |
| 4,814,769 | 3/1989 | Robin et al. | 380/48 |
| 4,897,659 | 1/1990 | Mellon | 342/45 |

Primary Examiner—Thomas H. Tarcza
Assistant Examiner—David Cain
Attorney, Agent, or Firm—Howard G. Massung; Robert A. Walsh

[57] ABSTRACT

A reply decoder (30) for declaring mode 4 replies when used with a KIR cryptograph computer (25) is described including timing logic (114), memory (112) for storing mode 4 replies and logic circuitry for analyzing replies stored in the memory (112). The invention further provides logic circuitry for detecting railing (117) i.e., successive replies, for detecting garbled or overlapping replies (123), for providing a floating density value window (114, 120) for summing the replies in nonselected reply positions and for target start/stop determination (215) based on selected criteria. The invention overcomes the problem of declaring excessive mode 4 replies which over burden the subsequent reply processing in a reply processor (50).

13 Claims, 14 Drawing Sheets

MODE 4 REPLY DECODER

BACKGROUND OF THE INVENTION

1. Field of the Invention

This invention relates to Identification Friend or Foe (IFF) reply decoders for military and Air Traffic Control (ATC) service and more particularly to signal processing of Pulse Code Modulation (PCM) for detecting and declaring Mode 4 replies.

2. Description of the Prior Art

An Identification Friend or Foe (IFF) system includes an interrogator which transmits a challenge message in a particular sector and listens for replies from transponders in the sector the challenge message was transmitted in. Within the interrogator is a reply decoder which after some pre-processing must sort out all the returns from various decoder transponders and declare valid mode replies. The format or waveform of the mode 4 reply as used herein consists of three pulses which are spaced 1.75 microseconds apart. Thus when an interrogator transmits a mode 4 waveform the reply decoder is looking for three pulses which are spaced 1.75 microseconds apart. When three pulses spaced 1.75 microseconds apart and each pulse of a specified width are detected, a single pulse is provided to the reply decoder for processing to determine whether or not it qualifies as a valid mode 4 response. The single pulse, which is also a narrow pulse, represents a reply position referenced from the leading edge from the first pulse of the three pulse mode 4 waveform. This initial processing is performed in an associated leading edge detector. The decoding function for mode 4 waveforms is inherently complex, requiring correlation of data, by range, over several interrogation sweeps. Where the interrogation antenna is mechanically scanned or rotated, or electronically steered, target hits must be correlated over the azimuth of target illumination. Final processing of mode 4 target data is software controlled in the associated Reply Processor; but first, all varieties of False Replies Unsynchronized In Time (FRUIT) must be removed to the extent practical in the Reply Decoder to avoid overburdening the Reply Processor computer. The Reply Decoder must also validate replies from transponders to ensure acceptance of only valid replies from friendly transponders, which may be, for example, on an aircraft, ship, helicopter or ground based vehicle.

Under conditions of heavy reply rates, the probability becomes high that normal replies will be overlapped, interleaved, or closely spaced and in time alignment. Hardware means of deriving leading and trailing edges of reply pulses and then deducing the correct position of the original reply pulses will reduce these effects, but some such situations will still exist.

Considering the large number of interrogators in many localities, plus the typically large number of transponder-equipped aircraft that are within operational range of one or more of these interrogators at any give time, a large number of replies will be received by each interrogator station or platform. Only those valid responses to a particular interrogation are of interest to the respective interrogator; other replies, known as False Replies Unsynchronized In Time (FRUIT), cause major reply processing problems for the reply processor, and this problem becomes acute in high reply density areas.

Hardware means are included in reply decoders, and software means in reply processors, to minimize such FRUIT interference; but these means can not be substantially effective when "garbled" replies exist, i.e., where two or more replies arrive at the interrogator receiver at approximately the same time. The degarbling of overlapping replies is a major problem of all reply decoders. Obviously, it is desirable to eliminate reply garbling without losing valid replies from interrogated transponders.

Two additional problems are encountered with Mode 4 IFF operation that are not usually encountered with Air Traffic Control Radar Beacon System (ATCRBS), Selective Identification Function (SIF), and Traffic Alert and Collision Avoidance System (TCAS) applications: (1) Unfriendly platforms may intentionally generate interference or jamming signals; (2) Unfriendly platforms may also generate "spoofing" signals in an attempt to mimic the valid replies of friendly platforms. The crypto-secure Mode 4 format greatly diminishes changes of spoofing deception. Replies are controlled by a cryptographic computer, hereinafter referred to as "KIT Computer". Replies received by the interrogator receiver are passed through a second Cryptographic Computer, hereinafter referred to as KIR Computer, to aid reply decoding. The KIT computer is located with a transponder and the KIR computer is located with the interrogator.

Previous Mode 4 Reply Decoders have employed several means to filter out unwanted pulses. Hardware means are generally used to defruit the reply datastream; i.e., removal of pulses that are not synchronized with the interrogation. Correlation of replies obtained on successive interrogation sweeps allows several other means to reject unwanted responses or interference. Most interrogators use mechanically scanned or electronically steered antennas, so they interrogate a segment of azimuth at any one time. Friendly platforms with transponders will respond while they are illuminated by the interrogator's main beam of electromagnetic radiation. To evaluate a series of replies from a plurality of transponders, target start and stop algorithms are used where a record of hits and misses is maintained until target stop criteria is exceeded. Number of hits per interrogation and/or hits/unit time and/or hits in range gate/unit time can also be summed or totalized in hardware or software. Target azimuth width, azimuth center, and azimuth increments between hits can be derived for further target evaluation by the associated Reply Processor.

Background density against which friendly replies must be sorted out can also be measured for acceptance of correct friendly replies and rejection of enemy spoofs and unintentional friendly interference. For any given target range and interrogation sweep, there may be, for example, 15 incorrect reply range positions and only one correct position. The sum of incorrect replies present, excluding any reply that might be present at the one and only correct reply range position, is known as "density value".

If an unfriendly platform utilizes the simpler spoofing method of railing interference, it can be detected by looking for pulses that trail (in time) the current analysis reply position at intervals of 1.75 microseconds.

The KIR computer generates a challenge message which is encoded and transmitted to the transponder where it is decoded by the KIT computer which introduces a variable time delay prior to retransmitting a reply consisting of three pulses which are spaced 1.75 microseconds apart. In the prior art the received reply was first passed through the KIR computer which provided a complement time delay to the received reply so that the sum of the KIT computer delay and the KIR computer delay added up to a known fixed total time delay.

SUMMARY OF THE INVENTION

In accordance with the present invention, an apparatus and method is provided for declaring Mode 4 replies received from a transponder comprising a memory for storing the mode 4 replies as a function of time, timing circuitry coupled to a KIR cryptograph computer for determining the KIR cryptograph computer delay to be applied to the received replies, the time delay selected by the KIR cryptograph computer from a plurality of predetermined delays, timing circuitry for providing range as a function of time coupled to the timing circuitry, and circuitry for determining a reply coupled to the memory for determining a reply and the range of the transponder transmitting the reply.

The invention further provides circuitry to compute a density value for Mode 4 replies in each active range cell, based upon the number of Mode 4 replies which lead and trail the current analysis reply at the non-selected plurality of predetermined delays.

The invention further provides an apparatus and method for detecting a predetermined number of replies within a predetermined number of consecutive reply positions after the first reply known as railing detection caused when a transponder sends out evenly spaced pulses at 1.75 microseconds.

The invention further provides circuitry for detection of overlapping replies also known as garbled replies.

The invention further provides circuitry for defruiting replies through correlation of replies from successive interrogation periods and qualification of replies into started, non-started and single-hit categories.

The invention further provides circuitry for computation of background density value for each range cell, which value will be evaluated subsequently by the associated Reply processor which is coupled to the reply decoder.

The invention further provides an apparatus and method utilizing a cryptograph computer having first circuitry for generating challenge messages for transmission by an interrogator to transponders in an Identification Friend or Foe system, second circuitry for generating a cryptograph determined time delay between an input and output port to signals received by the interrogator, the time delay changing for each respective challenge message, and third circuitry for generating a gain time control signal subsequent to each challenge message and fourth circuitry for interconnecting the gain time control signal to the input port of the second circuitry whereby the output of the gain time control signal from the second circuitry is delayed by the proper time with respect to the challenge message.

DESCRIPTION OF THE PREFERRED EMBODIMENTS

Figure 1:
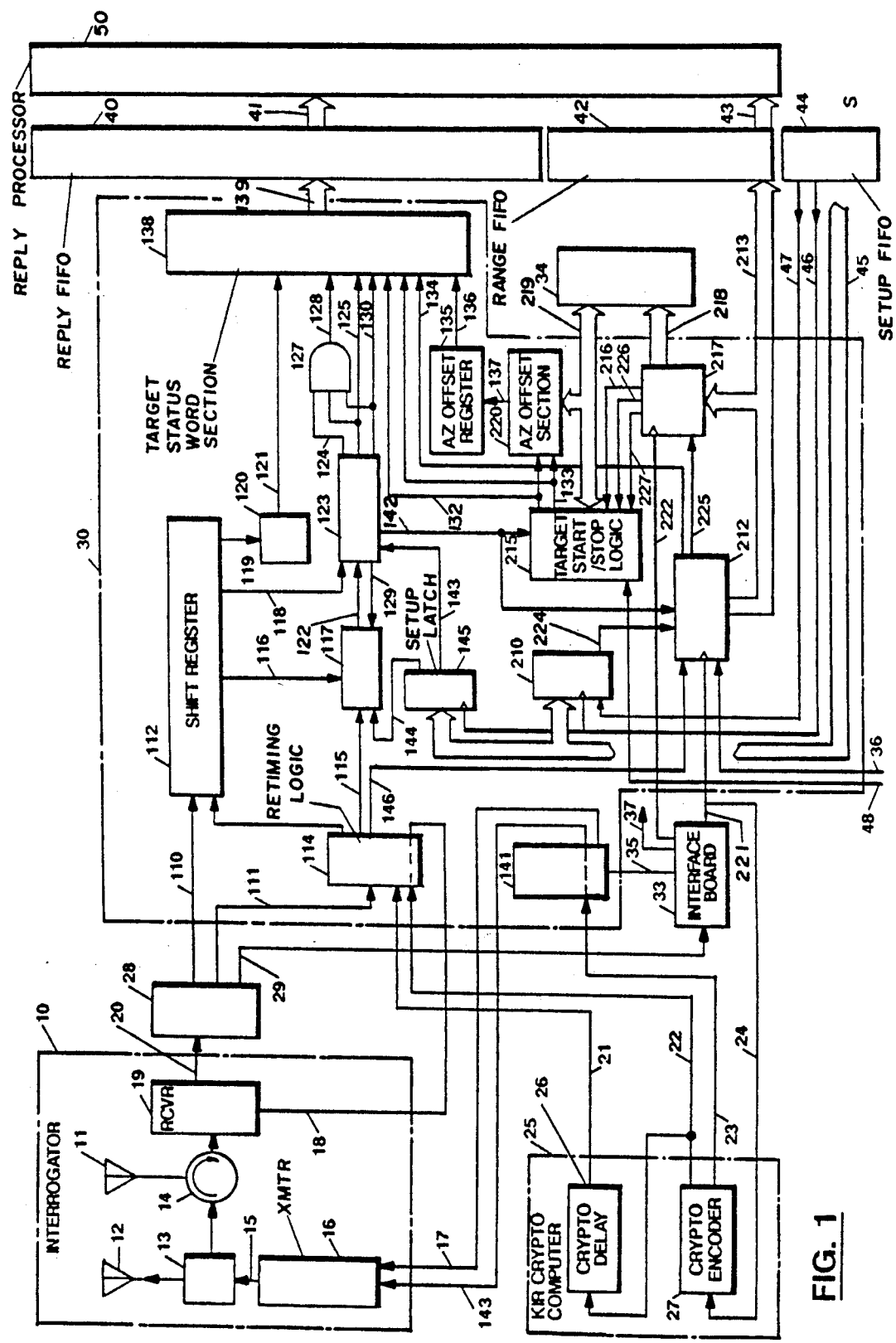
FIG. 1 is one embodiment of the invention.

Referring now to the drawings, FIG. 1 shows a reply decoder 30 coupled to an interrogator 10 a video quantizer and leading edge detector 28, a KIR cryptograph computer 25, and interface board 33, a random access memory (RAM) 34, and first in first out memories 40, 42 and 44. First in first out (FIFO) memories 40, 42 and 44 are coupled over data buses 41 and 43 respectively to reply processor 50.

Interface board 33 functions to provide a clock which may be, for example, at 8 MHz over lead 35 to an input of challenge video logic 141 of reply decoder 30. Interface board 33 also provides a signal M4PT over lead 24 to an input of cryptograph computer 25. Crypto encoder 27 within KIR cryptograph computer 25 initiates a new interrogation cycle or "sweep" in response to signal M4PT by generating signal KIRCV (KIR Challenge Video) over lead 23 and after appropriate delay, generates signal KIRGTC (KIR Gain Time Control) over lead 22.

Figure 2:
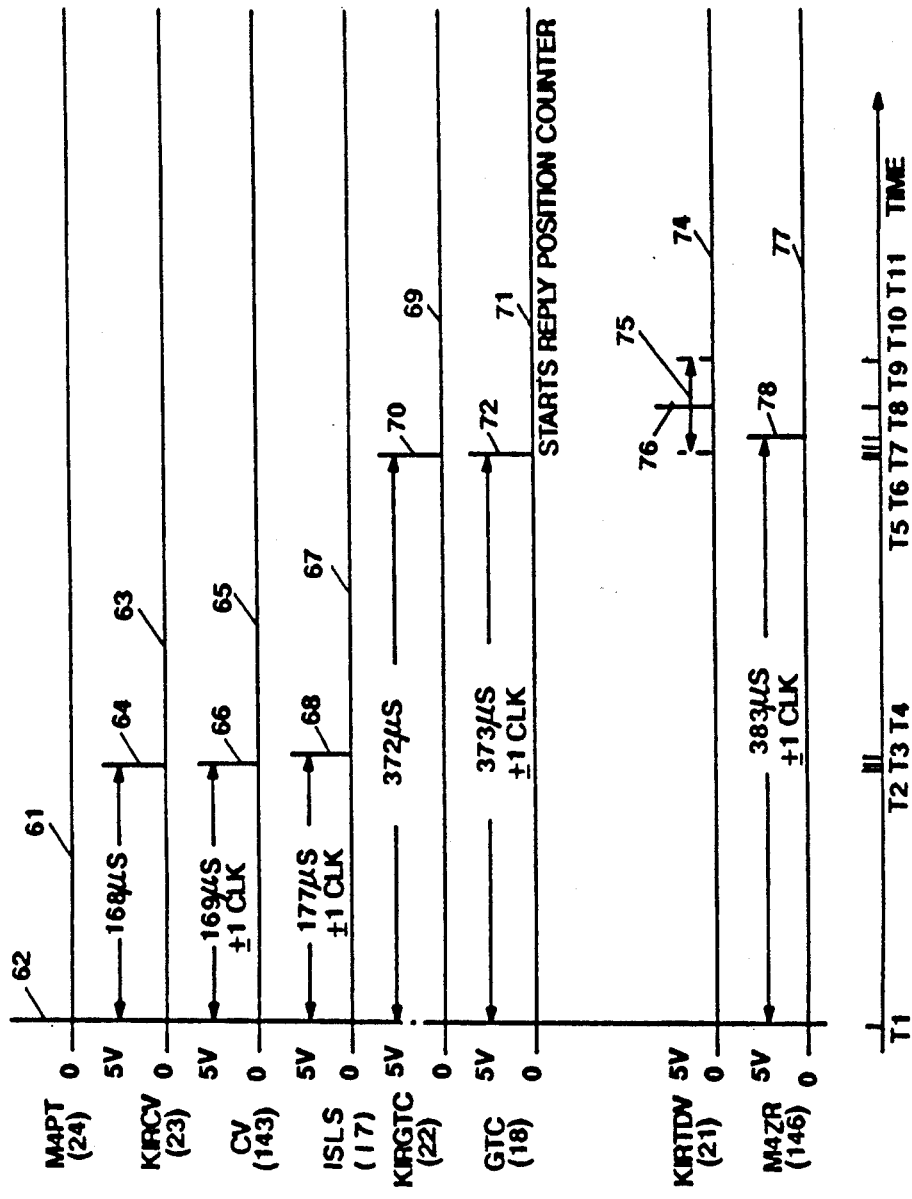
FIG. 2 is a graph showing a plurality of signals and their time of occurrence.

Referring to FIG. 2, signal M4PT on lead 24 is shown by waveform 61 which is low except for a narrow pulse 62 occurring at time T1. Signal KIRCV on lead 23 is shown by waveform 63 which is normally low except for pulse waveform 64 occurring at T2 which is 168 microseconds after T1. Signal CV on lead 143 is shown by waveform 65 which is normally low except for pulse waveform 66 occurring at T3 which occurs 169 microseconds +/−1 clock time (125 nanoseconds) after T1. Signal KIRCV is coupled over lead 23 to an input of challenge video logic 141 of reply decoder 30. Challenge video logic 141 functions to generate signal CV over lead 143 to an input of transmitter 16 of interrogator 10 and a signal ISLS (Interrogation Side Load Suppression) over lead 17 to an input of transmitter 16 of interrogator 10. Signal ISLS on lead 17 is shown in FIG. 2 by waveform 67 which is normally low except for pulse waveform 68 occurring at T4 which occurs 177 microseconds +/−1 clock time after T1. Challenge video logic 141 functions to reclock and delay by 1 microsecond the input signal KIRCV at T2 prior to generating signal CV at T3 to remove any time uncertainty since cryptograph computer 25 has an asynchronous clock with respect to the clock signal on lead 35 from interface board 33.

The output of transmitter 16 of interrogator 10 is coupled over lead 15 through antenna switch 13 to omnidirectional antenna 12 when transmitting in response to signal ISLS and through coupler 14 to antenna 11 in response to signal CV on lead 143. Antenna 11 may have a main beam width of 3 to 4 degrees for example and may be scanned mechanically or electrically. Transponders receiving the signal from antenna 11 in a narrow beam width after a period of time respond by transmitting a mode 4 reply wave form which is received by antenna 11. The signal received by antenna 11 passes through coupler 14 to an input of receiver 19. Receiver 19 is activated by signal GTC on lead 18.

The output of receiver 19 is coupled over lead 20 to an input of video quantizer and leading edge detector 28. The signal on lead 20 represents the amplitude waveform received by antenna 11 with the RF carrier signal removed. The signal on lead 20 during mode 4 waveform operation will consist of a series of three pulses each spaced 1.75 microseconds apart per reply and it is expected that replies may be overlapped as well as possibly having additional pulses added by unfriendly transponders to disrupt mode 4 operation. Video quantizer and leading edge detector 28 functions to verify that mode 4 replies are being received which is indicated by signal CKSW (Clock Switch) on lead 29 which is coupled to an input on interface board 33. Video quantizer and leading edge detector 28 further provides signal M4RZ (Mode 4 Range Zero) over lead 111 to an input of timing logic 114. Video quantizer and leading edge detector 28 also provides signal M4DR (Mode 4 Decoded Reply) over lead 110 to an input of shift register 112.

Crypto encoder 27 also generates signal KIRGTC (KIR Gain Time Control) over lead 22 which is externally coupled to an input of crypto delay 26 and an input of retiming logic 114. As shown in FIG. 2, signal KIRGTC is shown by waveform 69 which is generally low except for pulse waveform 70 which occurs at T5 which may be 372 microseconds after T1. Referring to FIG. 1, signal KIRGTC is injected over lead 22 as pseudo video into crypto delay 26 to provide a signal for the measurement of the time delay imposed in the reply path through crypto delay 26. Retiming logic 114 subtracts the crypto delay 26 delay value from a known predetermined time to determine the KIT crypto variable time delay inserted in the reply path of a transponder responding to the interrogators challenge message. By determining the KIT crypto time delay 26 the true range position of replies may be determined. In a conventional interrogator configuration, received pulses from receiver 19 would be 3-pulse decoded by video quantizer and leading edge detector 28 and then routed through crypto delay 26.

Signal KIRGTC is delayed with respect to signal M4PT to compensate for the fixed decode delay time of the transponder-associated KIT cryptographic computer (not shown) following reception of challenge video from interrogator 10 by way of antenna 11. Signal KIRGTC when received by retiming logic 114 starts a timer for the purpose of measuring the KIR crypto time delay interval Signal KIRGTC is reclocked at 8 MHz, for example, and further delayed 1 microsecond to match the delay of signal CV on line 143, to generate signal GTC over lead 18 to a control input of receiver 19 of interrogator 10. Signal GTC enables receiver 19 to receive replies from interrogated transponders. The 1 microsecond delay of signals CV and GRC is necessary to provide time for the Retiming Logic 114 to function and set up the Shift Register 112 as described below.

Crypto delay 26 generates signal KIRTDV (KIR Time-Decoded Video) over lead 21 to an input of retiming logic 114. Signal KIRTDV is generated in response to crypto delay 26 receiving signal KIRGTC on lead 22. Signal KIRTDV at retiming logic 114 stops the timer measuring the time delay interval of crypto delay 26 in KIR cryptograph computer 25. The measured value of delay of crypto delay 26 i.e., the time between signal KIRGTC and signal KIRTDV, represents the KIR cryptograph computer time delay that would have been imposed upon received replies from receiver 19 in a conventional configuration shown in FIG. 11 where an output of receiver 19 would be coupled to an input of crypto delay 26.

Figure 3:
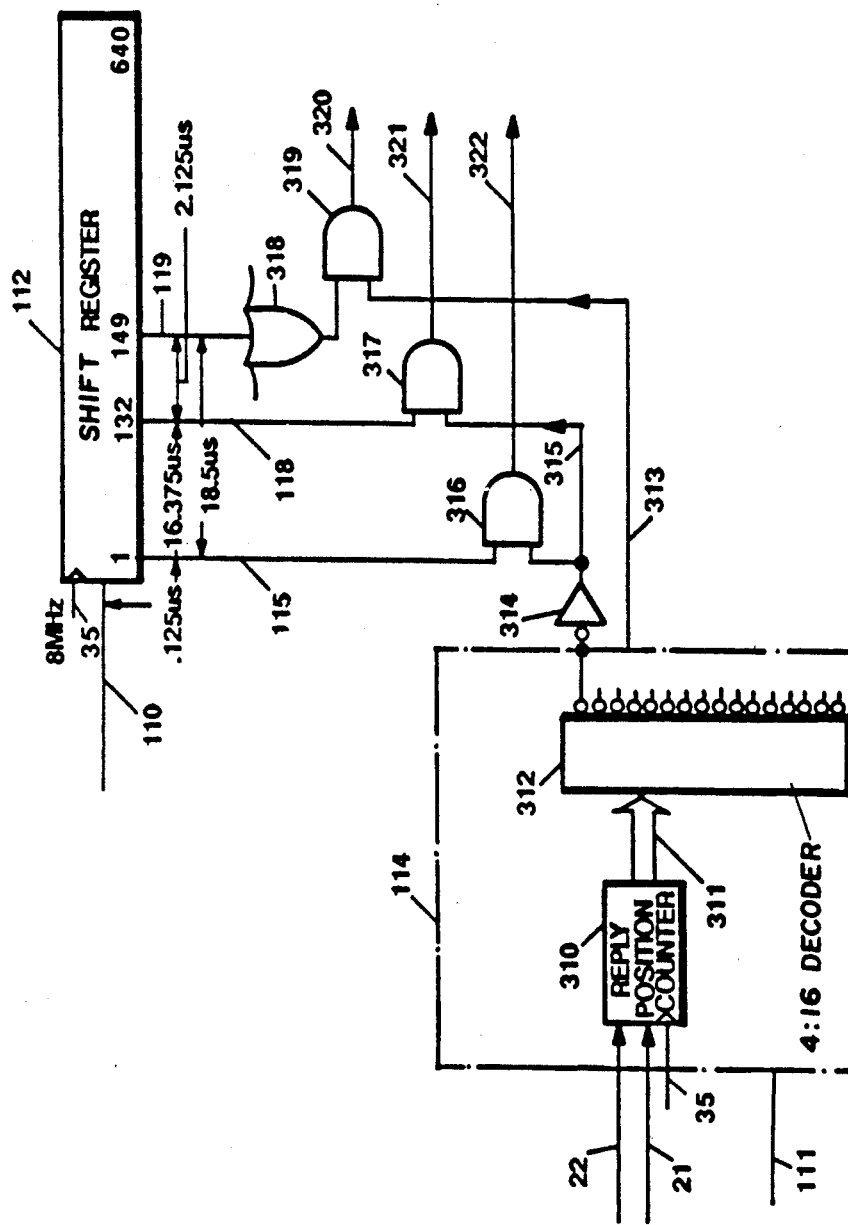
FIG. 3 shows circuitry of retiming logic 114 and shift register 112.

Upon determining the time delay of crypto delay 26 for valid transponder replies, retiming logic 114 activates 1 of 16 outputs, for example lead 313 shown in FIG. 3, to indicate correct reply position for the current reply under analysis The active reply position signal on lead 313 enables gates associated with shift register 112 to select taps 119 for density value computation in density value adder 120 shown in FIG. 1, taps 116 for railing detection and railing detector and adder 117, and taps 118 for quality evaluation in quality evaluation logic 123 shown in FIG. 1.

Figure 8:
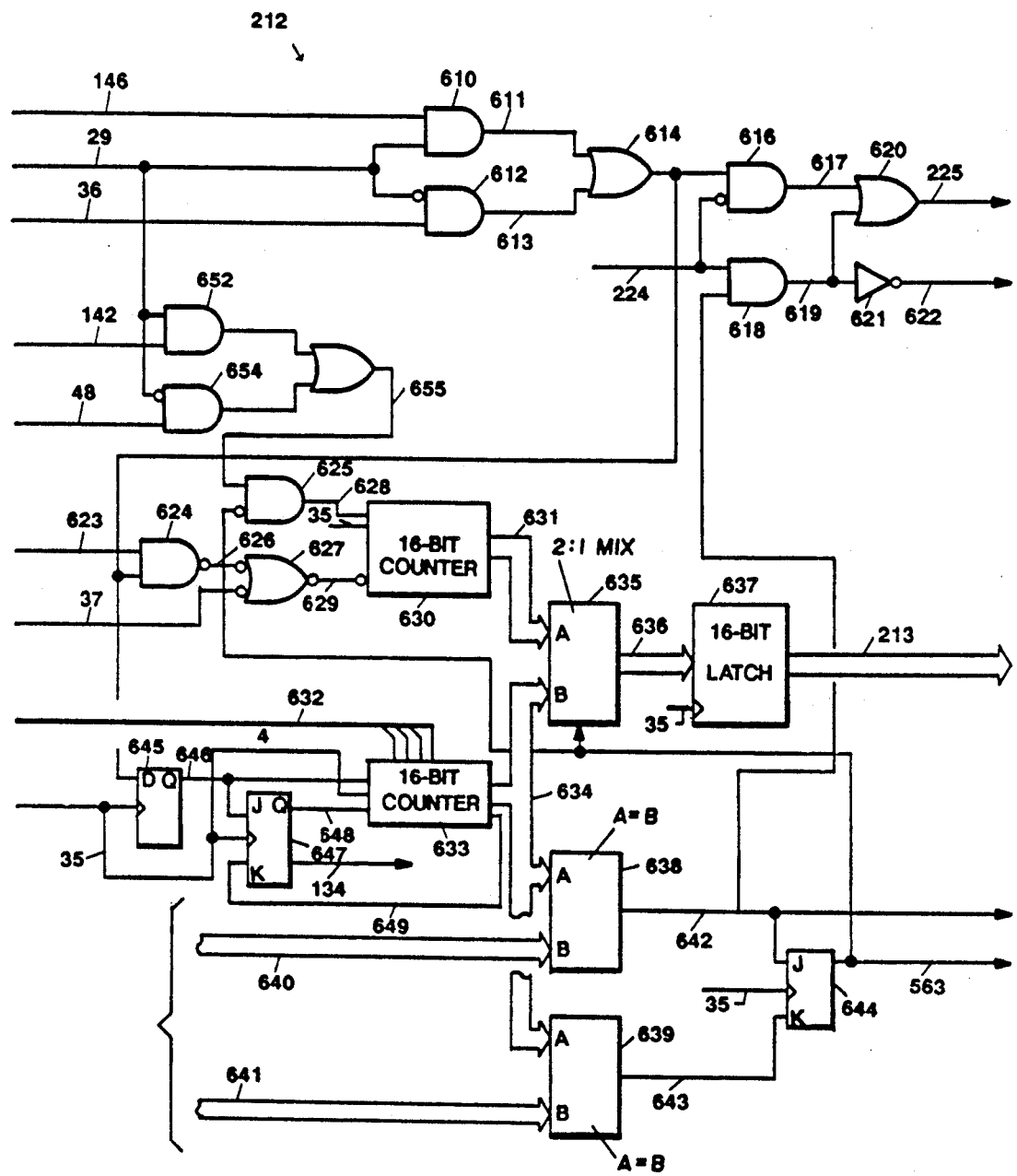
FIG. 8 is a logic diagram of range counter and reply totalizer 212.

Retiming logic 114 also delays signal M4RZ (mode 4 range 0) on lead 111 from video quantizer and leading edge detector 28 to provide signal M4ZR (Mode 4 Zero Range) on lead 146 to range counter and reply totalizer 212 shown in FIGS. 1 and 8. Signal M4ZR on lead 146 is delayed by retiming logic 114 to compensate for the processing time of shift register 112 and the known fixed delay time of the KIT cryptograph computer (not shown) and KIR cryptograph computer 25. Signal M4ZR is also delayed to compensate for processing delays in video quantizer and leading edge detector 28.

Referring to FIG. 2, signal GTC on lead 18 is shown by waveform 71 which is normally low except for pulse 72 which occurs at T6 which is normally 373 microseconds +/−1 clock time of 125 nanoseconds after T1. FIG. 2 also shows signal KIRTDV on lead 21 which is shown by waveform 74 which is normally low except for an interval between T7 and T10 shown by arrow 75 wherein a waveform pulse 76 occurs. T7 is positioned at a predetermined time after T1. T10 is positioned at a predetermined time after T1. Pulse 76 occurring at T9 may occur at 1 of 16 evenly divided positions between T7 and T10. Signal M4ZR on lead 146 is shown by waveform 77 which is normally low except for pulse 78 which occurs at T8. Pulse 78 occurs 383 microseconds +/−1 clock of 125 nanoseconds after T1. In FIG. 2 the abscissa represents time and the ordinate represents voltage.

Referring to FIG. 1, interface board 33 generates system clock frequencies for reply decoder 30. The range counter and reply totalizer 212 is clocked at, for example, 8.276 MHz over lead 221 so that the reply decoder target range data is in the same units for mode 4 as well as the Air Traffic Control Radar Beacon System (ATCRBS) and selective identification feature (SIF) system. Other logic sections in reply decoder 30 are clocked by the 8/8.276 MHz system clock on leads 35, and 16/16.552 MHz clock on lead 222 is used in the Random Access Memory (RAM) address counter logic 217 to generate read/write and RAM address output gate signals over lead 218 to random access memory 34.

The correct reply position is coupled over 1 of 16 leads, for example lead 313, FIG. 3) to an input of shift register 112. Retiming logic 114 generates signal FOUND which is coupled over lead 115 to an input of railing detector and adder 117. Shift register 112 has 16 taps one of which for example lead 116, is coupled to an input of railing detector and adder 117. Shift register 112 has 16 taps one of which may be lead 118 which is coupled to an input of quality evaluation logic 123. Shift register 112 has 16 taps one of which may be lead 119 which is coupled to an input of density value adder 120. The output of density value adder 120 is coupled over lead 121 to an input of target status word section 138.

Set up latch 145 has an output coupled over lead 144 which is signal RAILEN (rail enable) which is coupled to an input of railing detector and adder 117. An output of railing detector and adder 117 is coupled over lead 122, signal RAIL-12, to an input of quality evaluation logic 123. Quality evaluation logic 123 has an output, signal CAR14 which is coupled over lead 129 to an input of railing detector and adder 117. Set up latch 145 has an output signal, no quality required, which is coupled over lead 143 to an input of quality evaluation logic 123. An output of quality evaluation logic 123, signal M4RD-12 (mode 4 reply decoded-12) is coupled over lead 142 to an input of target start/stop logic 215 and to an input of range counter and reply totalizer 212. Quality evaluation logic 123 has an output coupled over lead 124 to an input of AND gate 127. Quality evaluation logic 123 has an output signal CLEAN coupled over lead 125 to an input of AND gate 127 and to an input of target status word section 138. Quality evaluation logic 123 has an output, signal RAIL FLAG, coupled over lead 130 to an input of AND gate 127 and to an input of target status word section 138. The output of AND gate 127, signal M4RD (Mode 4 Reply Decoder) is coupled over lead 128 to an input of target status word section 138.

A signal from an associated ATCRBS/SIF reply decoder is coupled over lead 48 to an input of target start/stop logic 215. A second signal from an associated ATCRBS/SIF reply decoder signal SIFZR (Selected Identification Feature Zero Range) is coupled over lead 36 to an input of range counter and reply totalizer 212. Start/stop criteria range gate width and other user-selectable parameters are entered into Setup FIFO 44 which is coupled over lead 46 to an input of set up latch 145 and set up demux and latch 210. Setup FIFO 44 also provides a signal DSTB (Data Strobe) to enter the data on lead 45 into set up latch 145 and set up demux and latch 210. Set up FIFO 44 also provides a data sheet signal on lead 47 to set up demux and latch 210. Output of set up demux and latch 210, new hit flag, is coupled over lead 224 to an input of range counter and reply totalizer 212. Range counter and reply totalizer 212 has a signal RAMSTART coupled over lead 225 to an input of RAM address counter and logic 217. Range counter and reply totalizer has an output signal, rollover fault, coupled over lead 134 to an input of target status word section 138. Range counter and reply totalizer has data, target range, coupled over lead 213 to an input of RAM address counter and logic 217 and to an input of range FIFO memory 42. Target range data is also coupled out of range FIFO memory 42 over data bus 43 to an input of reply processor 50.

RAM address counter and logic 217 has address signals coupled over lead 218 to the address input of random access memory 34. Data from random access memory 34 is coupled over data bus 219 to an input of target start/stop logic 215 and to an input of AZ offset section 220. The data on data bus 219 may travel in both directions. RAM address counter and logic 217 has an output signal data latch coupled over lead 216 to an input of target start/stop logic 215. RAM address counter and logic 217 has an output signal, gate, coupled over lead 226 to an input of target start/stop logic 215. RAM address counter and logic 217 has an output signal, R/W coupled over lead 227 to an input of target start/stop logic 215.

An output of target start/stop logic 215, signal new hit only, is coupled over lead 132 to an input of target status word section 138 and to AZ offset section 220. Target start/stop logic 215 has an output, signal target start, coupled over lead 133 to an input of the target status word section 138 and to AZ offset section 220.

AZ offset section 220 has an output coupled over lead 137 to an input of AZ offset register 135. AZ offset register 135 has an output coupled over lead 136 to an input of target status word section 138. Target status word section 138 has a output coupled over target bus 139 to an input of reply FIFO memory 40. Reply FIFO memory 40 has an output coupled over bus 41 to an input of reply processor 50.

Referring now to FIG. 3, shift register 112 may be a 640-stage shift register and is clocked at 8 MHz; shift register 112 serially stores incoming signal M4DR (Mode 4 Decoded Reply) wherein each pulse of M4DR represents a leading edge of a decoded reply on lead 110. Shift register 112 functions to analyze mode 4 reply from transponders by shifting them through the 640 stages in real time. For the purposes of railing interference detection, it is necessary to start looking for railing pulses 148 clocks (18.5 microseconds) ahead of the earliest possible reply position. Therefore, the first 148 stages of shift register 112 are used not only for railing detection, but they also delay density value computation until railing detection is complete. Each shift register tap 116 used for railing detection is in gate 316 with the corresponding reply position select line 315 from inverter 314, so that only one of the 16 rail lines 322 will be active on any given interrogation sweep. Taps 116 are positioned 4 microseconds, 32 stages, apart.

Similarly, one of 16 quality evaluation outputs 321 is selected by way of ANDing one of the taps 118 at gate 317 shown in FIG. 3 with the corresponding reply position select line 315 from decoder 312.

Conversely, 15 of 16 Density value computation outputs are enabled while the density value output 320 for the correct position is disabled. Taps 119 are coupled to a NOR gate which may include 3, 5, 7, 9, or 11 adjacent taps to tap 119 by setup. Shift register 112 with taps 116, 118 and 119 for railing detection, quality bit detection and density value computation are spaced from the next tap of the same function by 4 microseconds or 32 shift register stages.

Retiming logic 114 determines the correct reply position in the following manner. KIRGTC 22 enables reply time delay counter 310 to start counting at the 8 MHz rate. The counter increments until KIRTDV 21 disables it; then, the count will represent KIR cryptograph computer 25 time delay insertion by crypto delay 26. The first five stages of counter 310 shown in FIG. 3 are a modulo 32 counter to mark the 2 microsecond intervals; while the last four stages serve as a modulo 16 counter to count the 4 microsecond intervals. The 4-bit reply time delay count 311 is coupled to decoder 312 which is a 4:16 decoder to produce a low active reply position on lead 313.

Shift register stage 1 is separated from stage 132 by 16.375 microseconds. Shift register 112 stage 132 is separated from stage 149 by 2.125 microseconds. Stage 1 of shift register 112 is separated from stage 149 by 18.5 microseconds. Decoded replies on lead 110 are clocked into stage 1 of shift register 112 every 0.125 microseconds. Each bit in shift register 112 is shifted to the next stage every 0.125 microseconds. A decoded reply on lead 110 will be at stage 640 after a time delay of 80 microseconds. It is noted that after range 0 has been clocked into shift register 112 subsequent decoded replies shifted into shift register 112 represent decoded replies at a greater range from interrogator 10. Further it is noted that range 0 the correct reply position may be shifted in a 4 microsecond increment over 16 positions which corresponds to a maximum time difference for the position of range 0 of 60 microseconds. Once the correct taps have been selected as a function of the output of decoder 312 the selected taps define the analysis position starting at the appropriate time corresponding to range 0 as replies pass through shift register 112 the later replies representing transponders at farther ranges. Shift register 112 is operated in a free running condition in real time with taps 116, 118, and 119 dynamically picking off data and outputting the data via leads 320, 321 and 322 for subsequent analysis. Data continually flows at the 8 MHz rate on leads 320, 321, and 322.

Figure 4A:
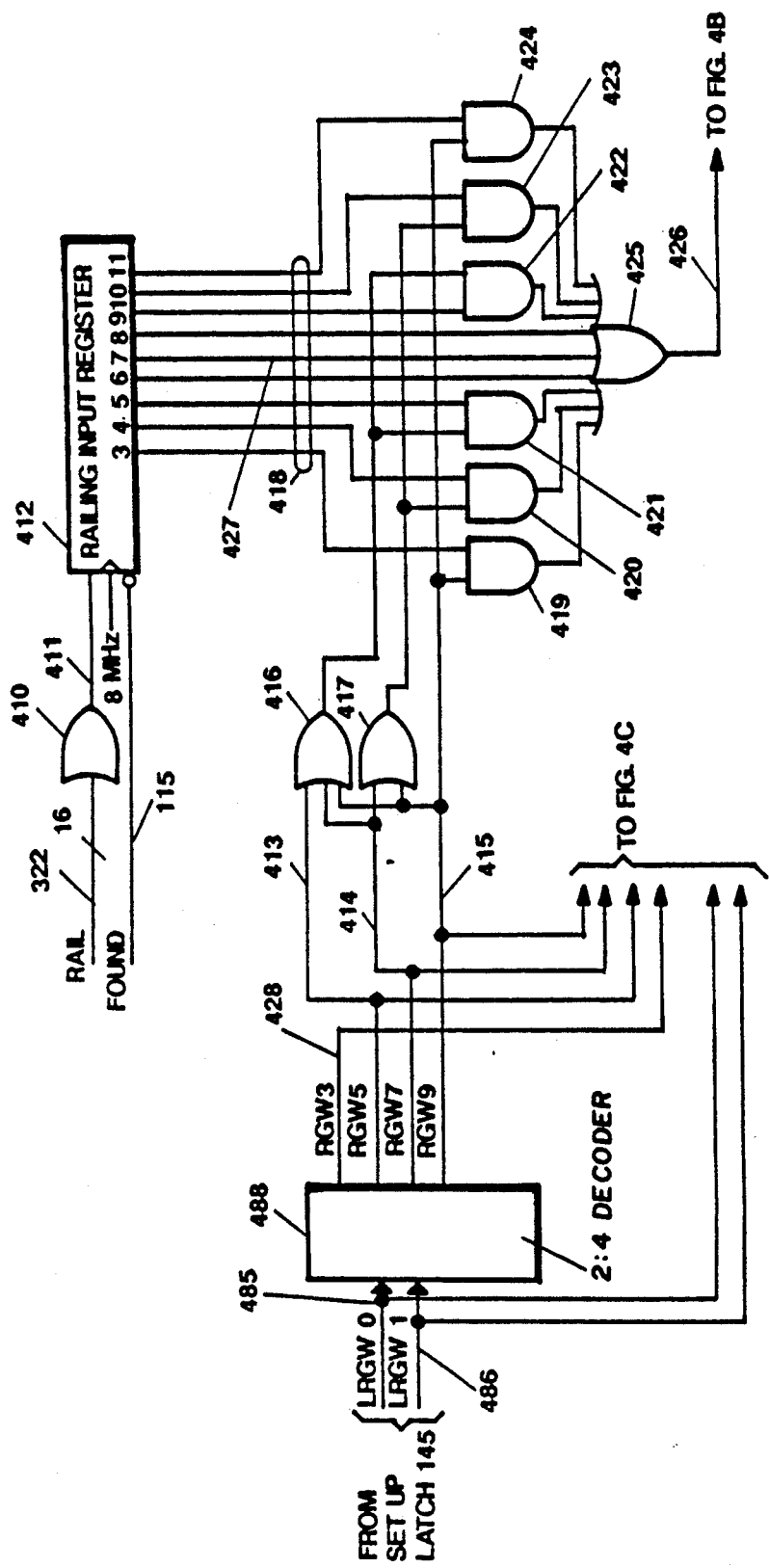
FIGS. 4A–4C show a logic diagram of railing detector and adder 117.

Signals RAIL 1 through RAIL 16 on leads 322 are passed as shown in FIG. 4A through OR gate 410 and over lead 411 to an input of railing input register 412 which may have, for example, 11 stages. Signal FOUNDB on lead 115 is coupled to the bar input of register 412. The outputs of stages 3-11 are coupled over leads 418 to a respective input of AND gates 419-424. The output of AND gates 419-424 are coupled to the input OR gate 425 having an output on lead 426 which is coupled to an input of railing detection register 449 shown in FIG. 4B. Set up conditions are coupled over leads 485 and 486 from set up latch 145 to an input of decoder 488 which may be for example a 2:4 decoder to provide 4 output leads with signals RGW3 (Railing Gate Window 3), RGW5 (Railing Gate Window 5) RGW7 and RGW9 respectively. RGW3 is coupled over lead 428 to AND gate 479 shown in FIG. 4C. RGW5 is coupled over lead 413 to an input of OR gate 416 and to AND gate 480 shown in FIG. 4C. RGW7 is coupled over lead 414 to an input of OR gate 416, an input of 417 and an input of AND gate 481 shown in FIG. 4C. Signal RGW9 is coupled over lead 415 to an input of OR gates 416 and 417 and to an input of AND gates 419, 424 and 482 shown in FIG. 4A. The output of OR gate 416 is coupled to an input of AND gate 421 and 422. The output of OR gate 417 is coupled to an input of AND gates 420 and 423. Stage 7 of register 412 is coupled over lead 427 to an input of OR gate 425. Stages 6 and 8 of register 412 are also coupled to respective inputs of OR gate 425. Register 412 is clocked at 8 MHz. In operation of the apparatus in FIG. 4A, the 11 stage railing input register 412 is cleared when signal FOUND 115 is low between the time KIRGTC 22 starts the Reply Time Delay Counter 310 and the time KIRTDV 21 stop the counter. When the correct reply position has been decoded by decoder 312 shown in FIG. 3, FOUND is set high and the CLEAR or Railing Input Register 412 is removed. Only one of the 16 RAIL 322 inputs, which is invariably 18.5 microseconds in advance of the correct density value position, is enabled. OR gate 411 passes the enabled railing input to railing input register 412, where a multiplicity of adjacent taps 418 is applied to blurring gates 419 through 424. Either 3, 5, 7, or 9 of these gates are enabled by decoder 488 to pass pulses which are time-aligned with the correct reply position or are within $+/-1$, $+/-2$, $+/-3$, or $+/-4$ clock pulses of that position. OR gate 425 passes any such pulse via output 426 to the rail detector register 449 (FIG. 4B).

The purpose of this selectable blurring of each input railing pulse provides a means to accommodate various degrees of jitter between pulses within a railed reply train.

Figure 4B:
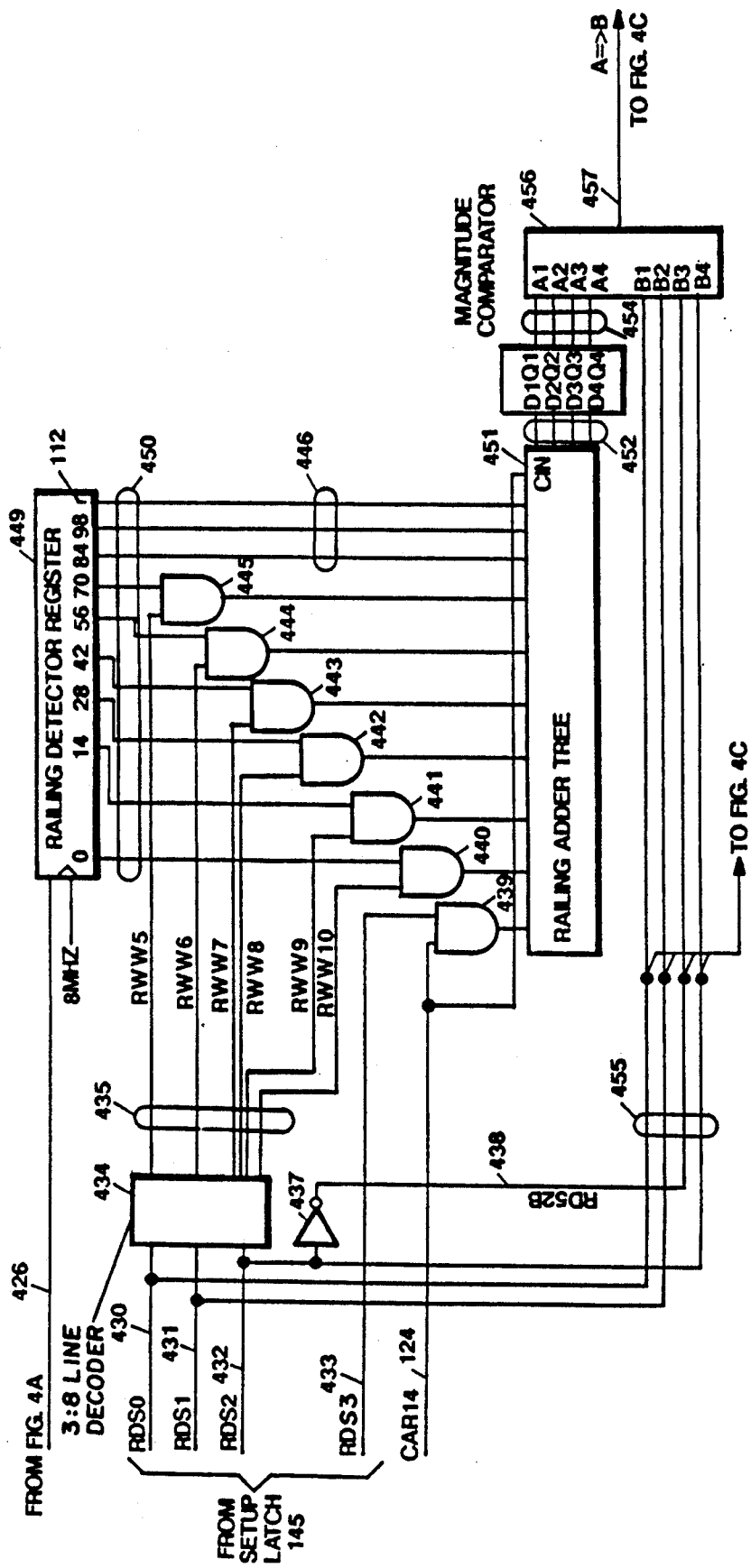

Referring to FIG. 4B, railing detector register 449 has 113 stages with taps 450 at 0, 14, 28, 42, 56, 70, 84, 98 and 112 stages. The time delay between taps for example stages 0 and 14 is 1.75 microseconds when register 449 is clocked at 8 MHz. Taps 450 at stages 0, 14, 28, 42, 56 and 70 are coupled to respective AND gates 440-445 each having an output coupled to railing adder tree 451. Taps 446 corresponding to a portion of taps 450 at stages 84, 98 and 112 are coupled to respective input of railing adder tree 450. Signal RDS0 is coupled over lead 430 to an input of decoder 434. Decoder 434 may be for example a 3:8 line decoder. Lead 430 is also coupled to B1 input of comparator 456 and to B0 input of 2:1 multiplexer 463 shown in FIG. 4C. Signal RDS1 is coupled over lead 431 to an input of decoder 434, the B2 input of comparator 456 and B1 input of multiplexer 463. Signal RDS2 is coupled over lead 432 to an input of decoder 434, to an input of inverter 437, to the B4 input of comparator 456 and to the B3 input of multiplexer 463. The output of inverter 437, signal RDS2B is coupled over lead 438 to the B3 input of comparator 456 and to the B2 input of multiplexer 463. Signal RDS3 is coupled over lead 433 to an input of AND gate 439 having an output coupled to railing adder tree 451. Signal CAR14 is coupled over lead 436 to an input of AND gate 439 and to the CIN input of railing adder tree 451. The output of AND gate 439 is coupled to an input of railing adder tree 451. Five outputs 435 of the decoder 434 with signals RWW5-RWW10 are coupled to a respective input of AND gates 445-440 respectively. Table I shows the possible values of signals RDS0 through RDS3 and the output leads 435 activated by decoder 434 to provide a railing window width of several taps of register 449 wherein adjacent taps 450 indicate a stream of transponder reply pulses separated by 1.75 microseconds.

TABLE I

RAILING WINDOW WIDTH TABLE

| Railing Window Width | RDS 2 | RDS 1 | RDS 0 | RWW n lines (435) |
|---|---|---|---|---|
| 4 | 0 | 0 | 0 | 4 no gates enabled |
| 5 | 0 | 0 | 1 | 5 |
| 6 | 0 | 1 | 0 | 5, 6 |
| 7 | 0 | 1 | 1 | 5, 6, 7 |
| 8 | 1 | 0 | 0 | 5, 6, 7, 8 |
| 9 | 1 | 0 | 1 | 5, 6, 7, 8, 9 |
| 10 | 1 | 1 | 0 | 5, 6, 7, 8, 9, 10 |
| (not used) | 1 | 1 | 1 | (not used) |

When signal RDS3 equals logic zero, railing adder tree 451 and comparator 456 look for consecutive railed replies equal to RWW from railing detector register 449 shown in FIG. 4B. When RDS3 equals logic 1, railing adder tree 451 and comparator 456 look for consecutive railed replies equal to RWW minus two since when signal RDS3 equals a logic one, AND gate 439 adds two (2) to the railing adder tree.

The output of railing adder tree 451 is coupled by way of four leads 452 through latch 453 over four leads 454 to inputs A1-A4 of magnitude comparator 456 which has an output over lead 457 at such times as the magnitude of the signals attached to inputs A1-A4 equal or exceed the magnitude of the signals coupled to inputs B1-B4. The signal on leads 454 represent the number of railed replies summed in railing adder tree 451. In operation of FIG. 4B, rail pulses 322 which have passed through the blurring gates of FIG. 4A are shifted into railing detector register 449 which may consist of 113-stages, which has a multiplicity of taps 450 which are arranged at 14 clock (1.75 microseconds) intervals. The 1.75 microsecond interval corresponds to the same pulse spacing as mode 4 reply pulses on lead 110 shown in FIG. 1. The 18.5 microsecond advance look of the railing input register 412 allows time to check up to 10 pulse interval positions for reply pulses received on lead 110.

Referring to FIG. 4A, the nominal position centertap 427 of the three always enabled input shift register taps of register 412 is delayed an additional 0.75 microseconds to provide a total 19.25 microsecond delay. The 19.25 microsecond delay is equal to 11 intervals at 1.75 microseconds. Therefore, any railing pulses present at or near correct time alignment with the correct reply position will be stored in the railing detector register 449 shown in FIG. 4B.

Referring to FIG. 4B, railing threshold i.e, number of railing pulses present at these look positions which contribute to the railing decision, is controlled by 4 setup lines RDS0 on lead 430 through RDS3 on lead 433. Signals RDS0 through RDS3 control the following actions:

(1) 3:8 line decoder 434 sets railing window width from 4 to 10 pulse interval positions to enable AND gates 440 through 445. Railing window width deriviation is shown in Table I.

(2) The setup MSB, RDS3 on lead 433 determines whether railing threshold is (n) or (n−2). When n−2 railing is selected, RDS3 on lead 433 enables AND gate 439, which adds the value 2 to the existing railing detection count when railing is present at the CAR14 position on lead 124 originating from shift register 512 shown in FIG. 5.

(3) Inverter 437 adds the value 4 to the octal value of the three LSBs, because 4 is a minimum window width, to form 4-bit threshold values from 4 through 10 for octal setup values of 0 through 6. Threshold value 455 is applied to magnitude comparator 456 and, if railing adder tree 451 latched output value 454 equals or exceeds this threshold, A equal or greater than B than output 457 will go high.

Figure 4C:
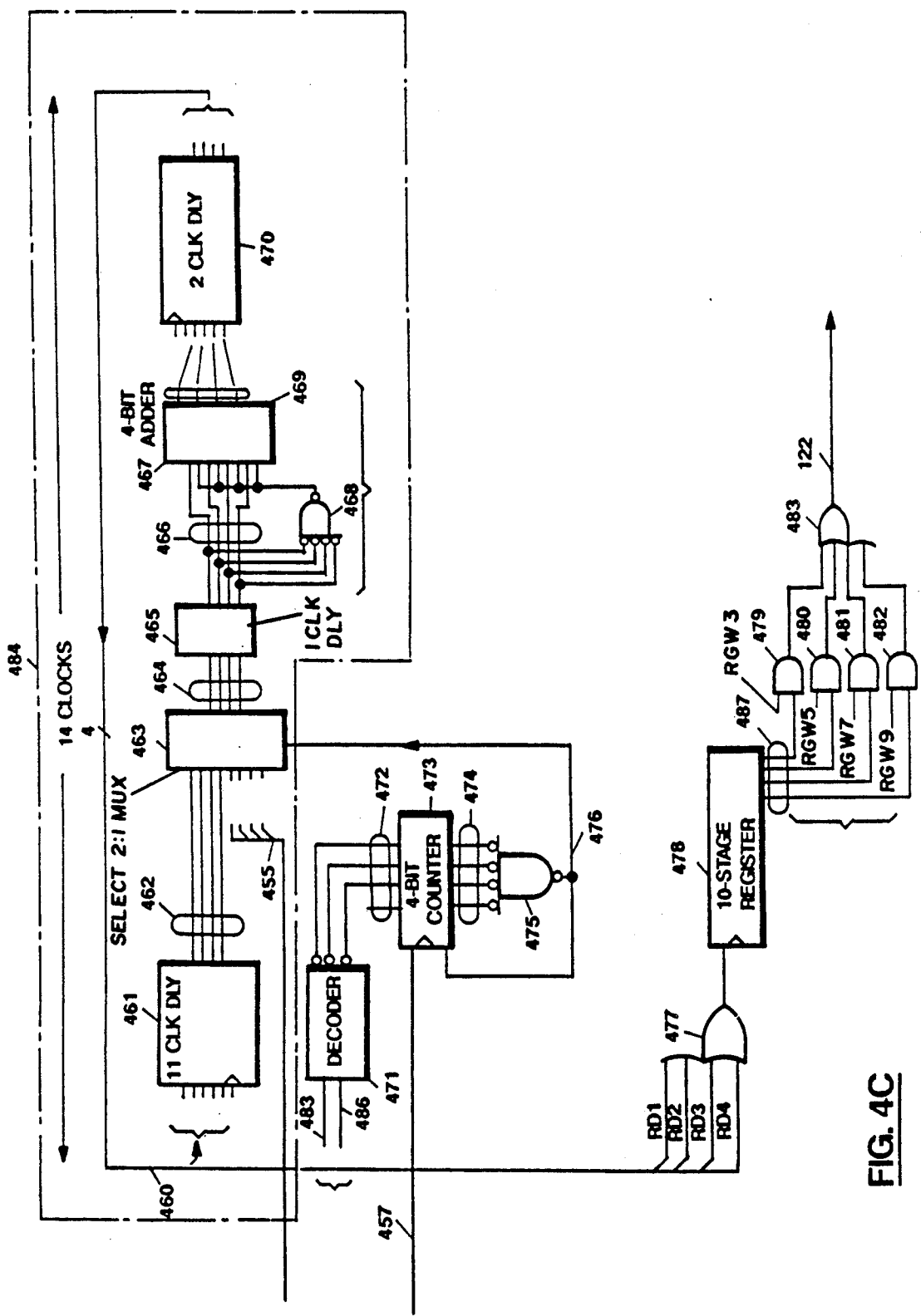

(4) Referring to FIG. 4C, the 4-bit threshold 455 is also applied to 2:1 multiplexer 463 as the initial number or replies (n−1) to be inhibited ("railed") following the initial reply which always will be declared using the present circuitry.

Referring to FIG. 4C the outputs 472 of decoder 471 are coupled to inputs A-D of 4-bit counter 473 the output of decoder 471 represents the 1's complement plus 1 of rail gate width. Input of A of counter 473 is always high. At such times as the signal on lead 457 is high counter 473 loads the outputs 472 into counter 473. An 8 MHz clock is coupled to a clock input of counter 473. The output of counter 473 leads 474 are coupled to logic 475 which decodes count 0. The output of logic 475 is coupled to the enable input of counter 473 and to a select input of multiplexer 463. At such times as logic 475 decodes count 0 of counter 473, multiplexer 463 selects A inputs. The output of multiplexer 463 is coupled via leads 464 through delay 465 which has a delay of 1 clock time having an output on leads 466 which are coupled to respective inputs of 4-bit adder 467 and gate 468 to provide in effect a subtractor of the value 1 from the value on the leads 466 when ever that value is other than zero. The output of adder 467 is coupled over leads 469 through delay 470 which may for example 2 clock times having an output over leads to an input of delay 461 which may have a delay of 11 clock times. The output of delay 461 is coupled over leads 462 to the A inputs of multiplexer 463. Leads 460 carrying signals RD1-RD4 are coupled to respective inputs of OR gate 477 having an output coupled to the data input of register 478. Register 478 may have for example 10 stages. An 8 MHz clock is coupled to register 478. Output stages 10-7 are coupled over leads 487 to respective inputs of AND gates 479-482 each having outputs coupled to respective inputs of OR gate 483 having an output over lead 122, signal RAIL-12. A second input of AND gates 479-482 is coupled to respective signals RGW3, RGW5, RGW7 and RGW9. Delay 461, multiplexer 463, delay 465, adder 467 and delay 470 are coupled in series and form a recirculating rail flag shift register 484 for shifting 4-bits of data through 14 clock intervals.

Referring further to FIG. 4C, at times when A is equal to or greater than B, 4-bit counter 473 is loaded with the 1s complement of the 2-bit value of railing gate width (blurring), plus 1, (15+1−RGW n), where (RGW n) is a value from 0 to 4 provided by setup inputs LRGW0 485 and LRGW1 486. These input enable blurring gates 419 through 424, FIG. 4A, and they also provide compensating delay equal to ½ of the position blurring window width so that the 4-bit data circulating in railing flag register 484 shown in FIG. 4C is synchronized with the centertap of railing input register 412, shown in FIG. 4A.

Referring to FIG. 4C, once counter 473 is loaded, it will increment on each system clock at 8 MHz until the necessary delay has expired. Then, at count 0, decoder 475 will output a low which switches 2:1 multiplexer 463 to the "A" inputs. These inputs complete a circulating loop of shift registers which is 4-bits wide and 14 clocks long. Thus, the B inputs to the multiplexer provided an initial value of (n−1), which is decremented every 14 clocks to keep the reply output inhibited for (n−1) replies following the railed reply.

The railing flag is developed by picking off the 4-bit value of replies remaining to be railed, and ORing them in gate 477 so that only a value of 0 will produce a low. The pick-off point is 3 clocks into the recirculating loop of shift registers 484. The final four stages of 10-bit shift register 478 are applied to AND gates 479 through 482, one of which will be enabled by Railing Gate Width signal RGW3, 5, 7, or 9) to shift the railing gate center as a function of selected gate width. These four AND gates are ORed by gate 483 to form a high-active Railing Flag (RAIL-12) for quality evaluation logic 123, shown in more detail in FIG. 5. Quality evaluation logic 123 provides delay 550 for delaying signal RAIL-12 an additional 12 clocks to coincide with the current reply declaration on lead 128.

Figure 5:
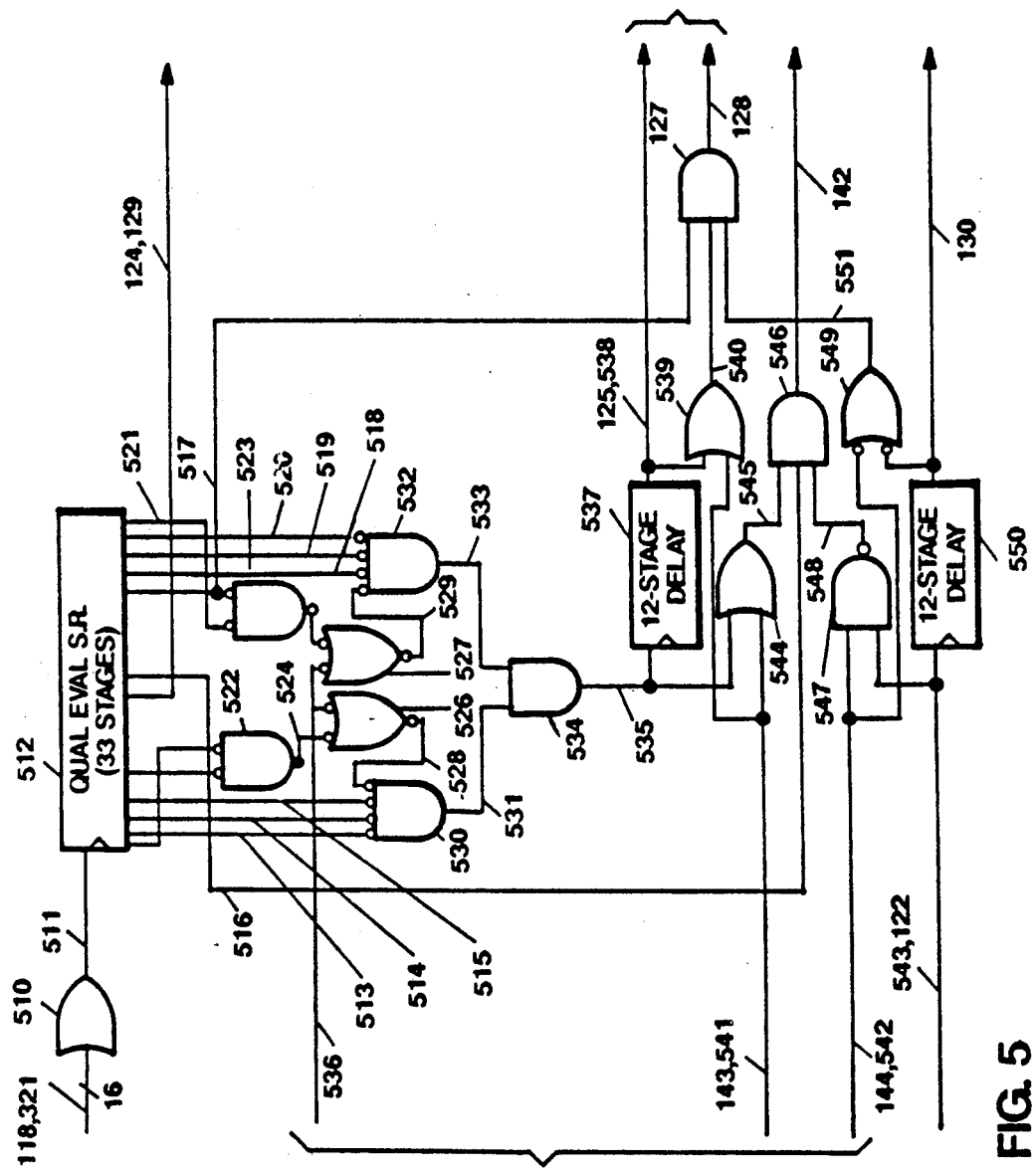
FIG. 5 is a logic diagram of quality evaluation logic 123.

Referring to FIG. 5, leads 321 containing signals QB1-QB16 (Quality Bit 1-16) shown in FIG. 3 is coupled to OR gate 510 over line 511 to the data input of shift register 512 which may consist of, for example, 33 stages. Shift register 512 is clocked at 8 MHz. Stage 1 is coupled to an input of AND gate 522. Stages 2–4 are coupled over leads 513–515 respectively to inputs of AND gate 530. Stage 5 is coupled to an input of AND gate 522. Stage 15 is coupled to lead 124 and carries signal CAR14. Stage 17 is coupled over lead 516 to an input of AND gate 546. Stage 29 is coupled to an input of AND gate 523 and over lead 517 to an input of AND gate 127. Stage 30–31 is coupled over leads 518–520 to respective inputs of AND gate 532. Stage 33 is coupled over lead 521 to an input of AND gate 523 having an output coupled over lead 525 to an input of OR gate 527 having an output coupled over lead 529 to an input of AND gate 532. Control signal 5WIDE from setup latch 145 is coupled over lead 536 to an input of OR gate 526 and 527. The output of AND gate 522 is coupled to a second input of OR gate 526 having an output coupled over lead 528 to an input of AND gate 530. The output of AND gate 530 is coupled over lead 531 to an input of AND gate 534 having an output CLN (CLEAN) coupled over lead 535 to an input of 12-stage delay 537 and an input of OR gate 544. Signal NO QUALITY REQUIRED from setup latch 145 is coupled over lead 143 to an input of OR gate 539 and an input of OR gate 544. The output of delay 537 is coupled over lead 125 to an input of OR gate 539 and to target status word section 138 with signal CLEAN. The output of OR gate 539 is coupled over lead 540 to an input of AND gate 127. Signal ENRAIL (Enable Rail) from set up latch 145 is coupled over lead 144 to an input of NAND gate 547 and NAND gate 549. The output of NAND gate 547 is coupled over lead 548 to an input of AND gate 546. The output of AND gate 546 is coupled over lead 142 to target start/stop logic 215 with signal M4RD-12. Signal RAIL-12 from railing detector and adder 117 is coupled over lead 122 to an input of NAND gate 547 and 12-stage delay 550. The output of delay 550 is coupled to an input of NAND gate 549 having an output coupled over lead 551 to an input of AND gate 127. The output of AND gate 127 is coupled over lead 128 to an input of target status word section 138 with signal M4RD (Mode 4 Reply Decoded). The output of delay 550 is coupled over lead 130 to target status word section 138 with signal RAIL FLAG.

As shown in FIG. 3, 17 taps (2.125 microseconds) in advance of each density value tap 119 of the shift register 112, a tap 118 is provided for input to the quality evaluation logic 123. This advance look allows time for the quality evaluation process to be completed concurrently with the density value computation. Quality evaluation logic 123 functions to examine signal M4DR on lead 110 as it leaves shift register 112 on lead 118 to see if there are adjacent overlapping replies. Density value adder 120 functions to sum the replies on signal M4DR on lead 110 in shift register 112 in 15 of the non selected reply positions and specifically excluding the valid reply position to provide an indication of the number of replies in shift register 112 in the nonselected reply positions extending over 56 microseconds while the reply position extends over 4 microseconds.

Referring to FIG. 5, quality evaluation logic 123 is shown. 16 quality bit input lines on leads 321 pass through OR gate 510 and form a common quality bit data stream 511 with data from the selected reply position only. The signals on lead 511 are shifted into 33-stage quality evaluation shift register 512. AND gates 530 and 532 form two windows where the center taps are separated by twice the 1.75 microsecond spacing of the 3-pulse reply transmitted by a transponder. AND gate 532 looks for the absence (i.e., lows) of leading (earlier) reply decodes while AND gate 530 looks for trailing (later) reply decodes. The first three stages of the quality evaluation shift register 512 provide 0.375 microsecond delay to the center of the trailing reply window. The stage 15 of shift register 512 is also forwarded to the railing adder as a carry-in which is 14 clocks (1.75 microseconds) in advance of the analysis reply output tap. As shown in FIG. 5 stage 15 is coupled over lead 124 with signal CAR14.

If a reply appears in either of these two windows AND gate 534 output will be a logic low. When there are no replies in either the leading or the trailing windows, the outputs of both 530 and 532 will be HIGH, causing the CLEAN output of 534 to be HIGH. AND gate 534 will enter this high into a 12-stage digital delay 537 to delay the CLEAN bit until the reply under analysis has propagated 12 clocks to the reply tap 517. Then, the reply under analysis from tap 517, and the delayed CLEAN bit on lead 538 ORed in gate 539 with the NO QUALITY REQUIRED on lead 143, are ANDed together in gate 127 with the enabled Rail Flag 551 to generate M4RD (Mode 4 Reply Decoded) on lead 128. The enabled Railing Flag input on lead 551 to AND gate 127 will be high except when railing has been enabled (line 144) and detected (line 122). M4RD on lead 128 is one bit of the target status word coupled over bus 139 to be unloaded into reply FIFO memory 40.

Figure 11:
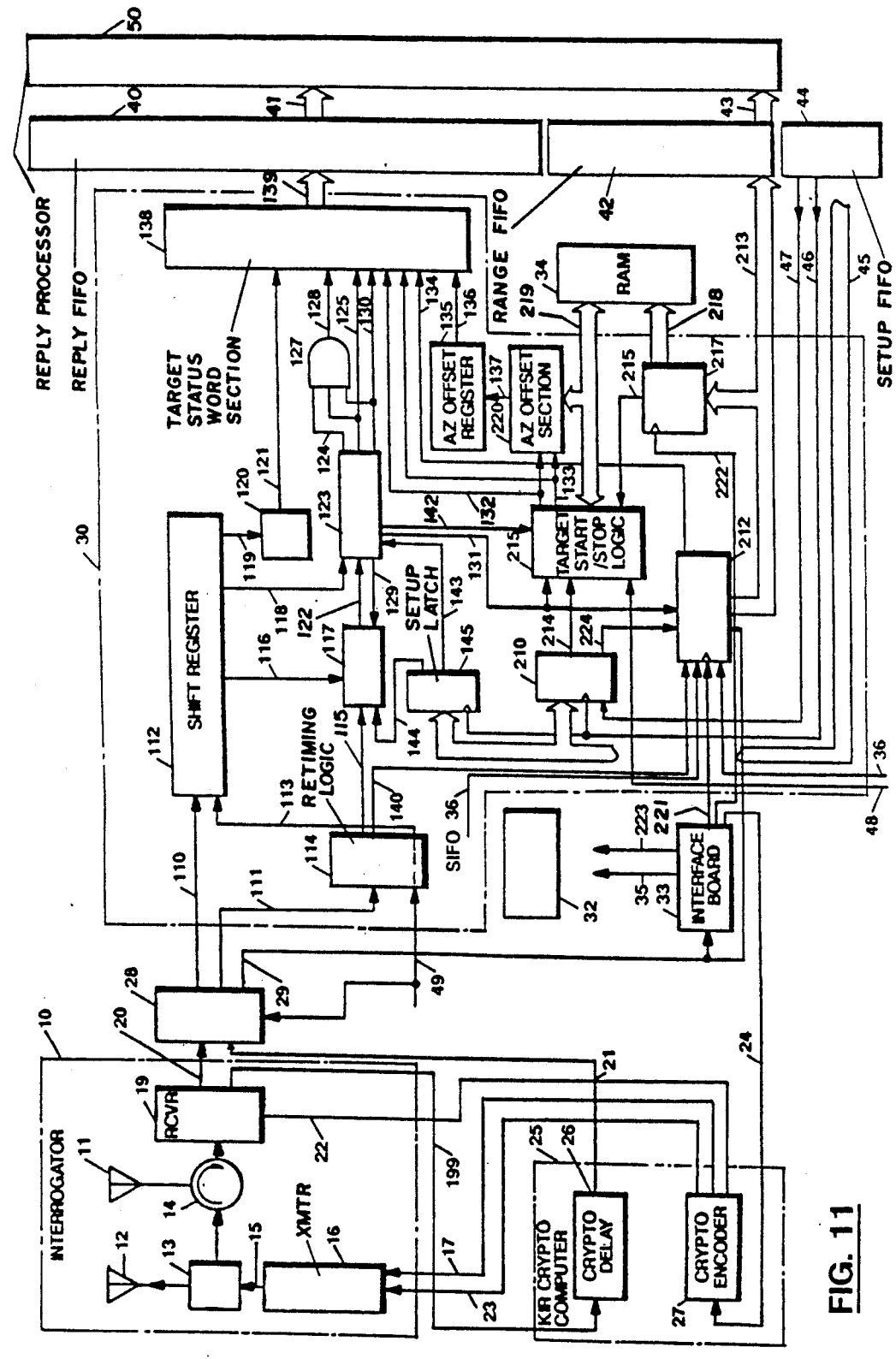
FIG. 11 is an alternate embodiment of the invention.

Referring to FIG. 5, when 5WIDE input signal on lead 536 is active, it enables two additional shift register taps of shift register 112 for each of the two reply pulse windows, so that they are opened to a 5-clock width. Wider windows are used with the alternate embodiment in direct connection of KIR cryptograph computer 25 (as shown in FIG. 11) because of the highly time jitter implicit in the alternate mode 4 decoding scheme.

Whenever railing detection is enabled and railing has been detected and a reply is also present, AND gate 127 will be disabled. Rail-12 on lead 543 is delayed in 12-stage-digital delay 550 to disable AND gate 127 when the analysis reply is also present. Rail flag on lead 130 is included in the target status word 138 for the declared replies so that reply processor 50 is aware that additional railed replies are present in the vicinity of the current declared reply.

Quality evaluation logic 123 also generates signal M4RD-12 (mode 4 New Hit) on lead 142 when a replied decode is present at the current analysis position stage 17 of register 512, and either the CLEAN bit is present or the no quality required signal on lead 143 is active, and railing is either not present or not enabled.

Referring to FIG. 5, the logic elements involved in this function are OR gate 544, NAND gate 547, and AND gate 546. Digital delays 537 and 550 work together with OR gate 539, NAND gate 549 and AND gate 127 to provide signal M4RD output in time coincidence with the declared reply. The first reply in a series of railed replies will be passed to reply FIFO memory 40, but signal M4RD-12 on lead 142 will be inhibited for subsequent replies in the series of the replies. Signal M4RD-12 on lead 142 is stored as a miss in the new hit register of target start/stop logic 215. Then, subsequent railed replies will not be passed to target start/stop logic as signal M4RD-12 on lead 142. Therefore, there can be no new hit registered and no new target start; rather, a started target count will be decremented. Also, the signal NHONLY (New Hit Only Bit) 132, which is returned to Reply FIFO memory 40 as part of the status word, will be inhibited.

Quality evaluation logic 123 checks whether the current analysis reply is clean (i.e., no closely spaced or overlapping replies). Since the 3-pulse decoded reply input on lead 110 shown in FIG. 1, is a single, narrow pulse which represents the 3-pulse decoded reply with pulse spacing of 1.75 microseconds, an overlapping condition is inferred by looking for 3-pulse decodes in register 512 that lead or trail the analysis position by 1.75 microseconds.

Figure 6:
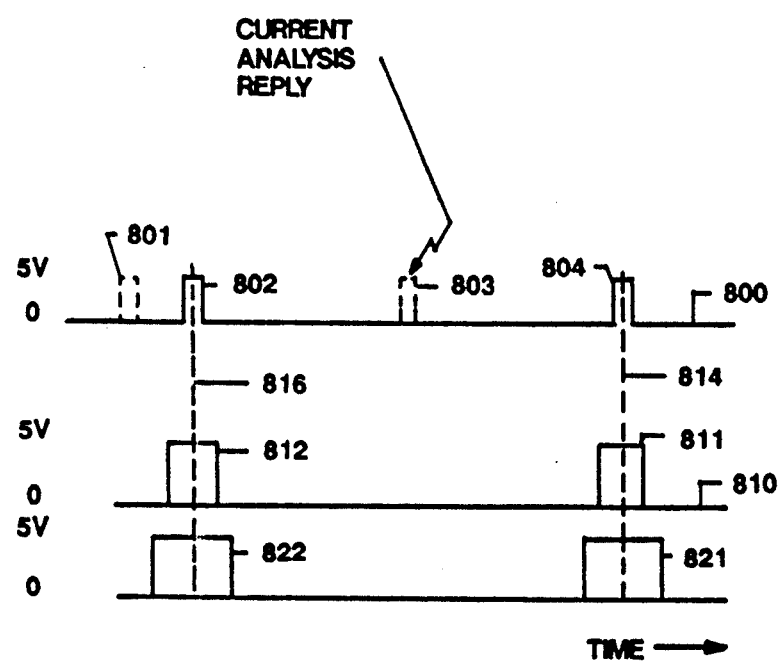
FIG. 6 is a graph showing a timing diagram.

Referring to FIG. 6, waveform 800 having pulses 801 through 804 is shown representative of pulses entering shift register 512 and propagating from left to right. In FIG. 6, the abscissa represents time and the ordinate represents a voltage. Pulse 801 represents the input to stage one of shift register 512. Pulse 802 represents the F2 position of an overlapping trailing reply at stage 31 of shift register 512. Pulse 803 represents the current analysis reply at stage 17 of shift register 512. Pulse 804 represents the F2 position of an overlapping leading reply at stage 31 of shift register 512. The leading edge of pulse occurring 802 is positioned 1.75 microseconds behind the leading edge of pulse 803. The leading edge of pulse 803 is positioned 1.75 microseconds behind the leading edge of pulse 804. Therefore pulse 802 is positioned 14 stages in shift register 512 behind pulse 803 which in turn is positioned 14 positions of shift register 512 behind pulse 804. Waveform 810 in FIG. 6 shows leading window 811 and trailing window 812 with reference line 814 showing the center of the leading window and reference line 816 showing the center of the trailing window. Windows 811 and 812 each have the width of three shift register stages. At times when signal 5 WIDE is present additional logic gates are enabled to provide windows 821 and 822 corresponding to the leading and trailing window wherein each window is five stages wide of shift register 512. Windows 811, 812, 821 and 822 show where a pulse occurring within the window will be detected to cause signal CLN on lead 535 to be low.

To accommodate time jitter and pulse-spacing tolerance of the particular Reply Decoder 30 application, the leading and trailing reply look positions are blurred or ORed either by 3 or 5 adjacent taps of the shift register, as setup by the user to suit his application. Also, when No Quality Required signal is low on lead 143, only those replies which are clean (i.e., no reply present in either garble window) can be loaded into target status word section 138.

Figure 7:
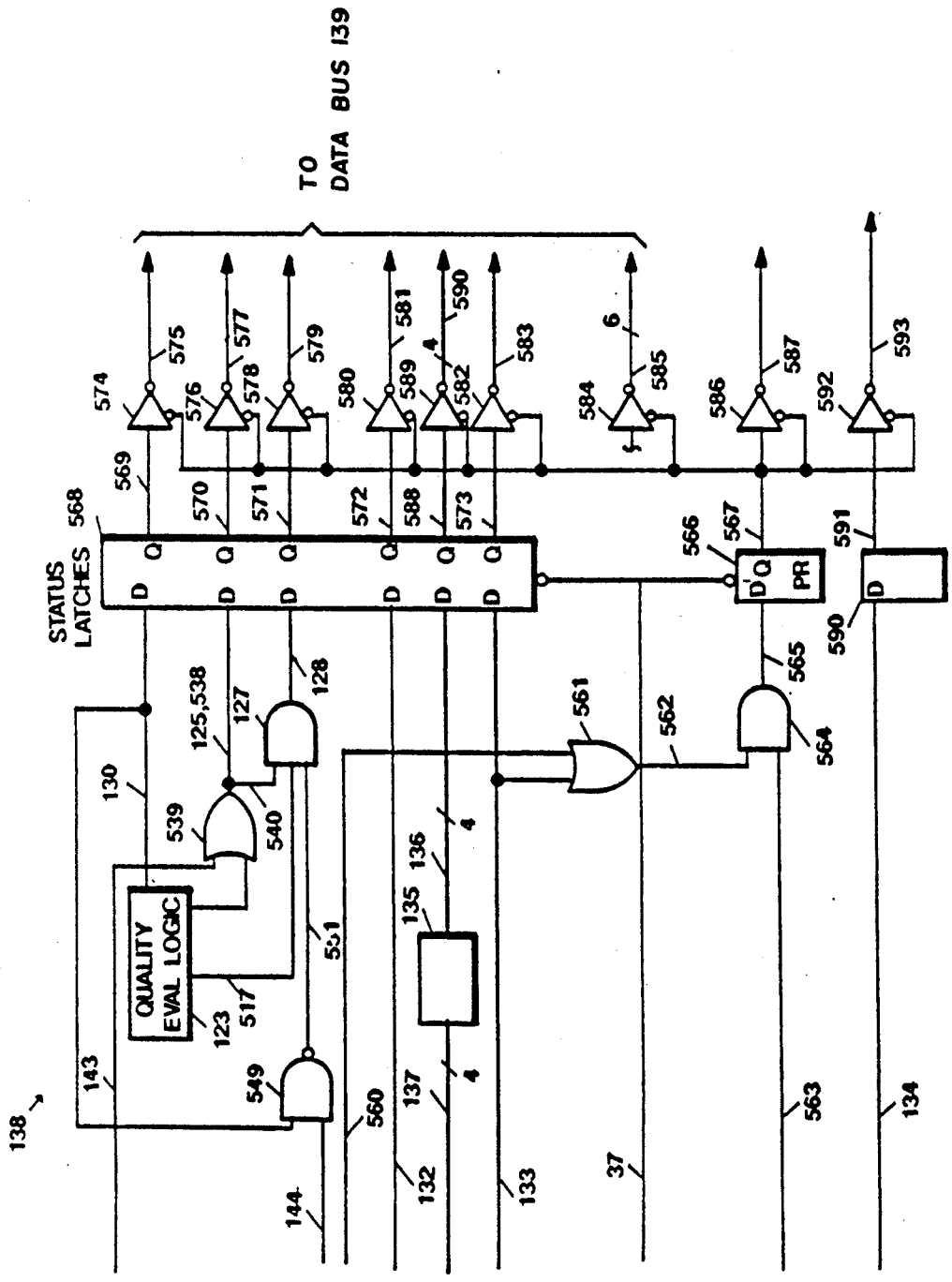
FIG. 7 is a logic diagram of target status word section 138.

Referring to FIG. 7, target status word section 138 is shown in more detail. Signal NO QUALITY REQUIRED is coupled over lead 143 from setup latch 145 to an input of OR gate 539 having an output coupled over lead 540 to an input of AND gate 127. Quality evaluation logic 123 provides signal CLEAN over lead 125, 538 to an input of OR gate 539 and to an input of status latches 568. Quality evaluation logic 123 provides signal reply position over lead 517 to an input of AND gate 127. Quality evaluation logic 123 provides an output signal Rail Flag over lead 130 to an input of NAND gate 549 and an input of status latches 568. Signal ENRAIL is coupled over lead 144 to an input of NAND gate 549 having an output coupled over lead 551 to an input of AND gate 127 having an output, signal M4RD coupled over lead 128 to an input of status latches 568. Signal ENM4AR (Enable Mode 4 Actual Range) is coupled from setup latch 145 over lead 560 to an input of OR gate 561. Signal NHONLY (New Hit Only) is coupled over lead 132 to an input of status latches 568. Signal AZ OFFSET/0-3 is coupled over lead 137 to an input of AZ offset register 135 having an output coupled over lead 136 to an input of status latches 568. Signal target start is coupled over lead 133 to an input of OR gate 561 and to an input of status latches 568. Status latches 568 has respective outputs 569-573 coupled to respective output buffers 574, 576, 578, 580, 589, and 582 having respective outputs 575, 577, 579, 581, 590, and 583. Signal range gate is coupled over lead 563 to an input of NAND gate 564 having an output coupled over lead 565 to an input of latch 566. The output of OR gate 561 is coupled over lead 562 to an input of NAND gate 564. The output of status latch 566 is coupled over lead 567 to the load input of output buffers 574, 576, 587, 580, 589, 582, 584, 586, and 592. Signal rollover fault is coupled over lead 134 to an input of status latch 590 having an output over lead 591 to an input of output buffer 592. Output buffer 592 has an inverted output on lead 593 with signal rollover fault which is coupled to reply FIFO memory 40 via data bus 139. Output buffer 586 provides signal UNLOADB which is coupled over lead 587 to FIFO memories 40, 42, and 44. Output buffer 584 has an inverting output on lead 585 which is coupled to reply FIFO memory 40 which may be duplicated to provide additional bits of signals having a plurality of bits to reply FIFO memory 40. Signal CLRB from interface board 33, shown in FIG. 1, is coupled over lead 37 to the CLEAR input of status latches 568 and to the PR input of status latch 566.

In operation of status word section 138 shown in FIG. 7, status word section 138 provides at its output a 16-bit status word to reply FIFO memory 40 when output buffers 574, 576, 578, 580, 582, 584, and 586 are gated on by signal UNLOAD on lead 567. Signal UNLOAD on lead 567 will be generated for any target within the range gate indicated by signal range gate on lead 563, provided that target start flag 133 is set to a logic "1". These two conditions are prerequisite to declaring any reply by reply decoder 30 and unloading it to FIFO memory 40.

Three types of replies can be declared by reply decoder 30 and passed to reply FIFO memory 40, as determined from inputs or replies to reply decoder 30 and by setup inputs of reinforced replies, strobed replies, and actual-range target replies.

Reinforced replies occur whenever a new hit is present within target start gate width (window). Strobed replies are at the range of the target start flag, and occur when no new hit is present for a previously started target within the target start flag gate width (i.e., target start flag 133 set). Strobed replies are identified by M4RD 579 and HNONLY 581 bits being false. Actual range target replies are enabled by ENM4AR 560 and occur when there is a new hit within the target start flag gate width, but they occur at the actual range of the new hit. If the new hit is in the same range cell as the target start flag, only one reply will be output; but if the new hit is within the target start window but not in the same range cell as target start flag, replies will be output both at the target start flag range cell and at target actual range.

Reply status word output format and content is shown in Table 2.

TABLE 2

| Mnemonic | Status |
| --- | --- |
| DV0–DV3 | Density Value computation for the current Target Start; a 4-bit number from 0 to 15 which indicates the number of replies received at the 15 incorrect positions for a given target range. |
| RO | Rollover Fault (of range counger 633) will be true if the range counter has reached terminal count and is then inhibited at approximately 640 nautical miles. |
| Rail Flag | Rail Flag is true where railing has been detected which trails the current reply. |
| Clean | Clean quality bit for Mode 4 decoded replies. |
| NHONLY | Indicates a reply within the range gate window width (which is centered about the range of the Target Start flag). (Will always be true when M4RD is true, because M4RD requires the current reply to be within the same range cell as Target Start Flag.) |
| Start Flag | Target Start Flag in current range cell. |
| M4RD | Actual-target/strobe flag. (Refer to Table 8-1 for logic of this status bit.) |
| AZ0F0–3 | Azimuth Offset. This value is the in stored n/CM-1 value between first hit and Target Start. |

FIG. 8 shows the logic circuitry for range counter and reply totalizer 212. Signal M4ZR is coupled over lead 146 to an input of AND gate 610 having an output coupled over lead 611 to an input of OR gate 614. Signal CKSW is coupled over lead 29 to an input of AND gate 610 and to the inverted input of AND gate 612. Signal SIFZR is coupled over lead 36 to an input of AND gate 612. The output of AND gate 612 is coupled over lead 613 to an input of OR gate 614 having an output coupled to the input of AND gates 616 and 624 and to the data input of latch 645. Signal POPEN is coupled over lead 224 to the inverted input of AND gate 616 and to AND gate 618. The output of AND gate 616 is coupled over lead 617 with signal range normal start to an input of OR gate 620 having an output over lead 225 with signal RAM START. Signal target range start on lead 642 is coupled to an input of AND gate 618 having an output coupled over lead 619 to an input of OR gate 620 and an input of inverter 621 having an output on lead 622 with signal R/WCLRB.

Signal M4RD-12 is coupled over lead 142 to an input of AND gate 652. Signal SIF NEW HIT is coupled over lead 48 to an input of AND gate 654. Signal CKSW is coupled over lead 29 to an input of AND gate 652 and the inverted input of AND gate 654. The output of AND gate 652 is coupled to an input of OR gate 653. The output of AND gate 654 is coupled to an input of OR gate 653 having an output on lead 655 with signal NEW HIT which is coupled to an input of AND gate 625. The output of AND gate 625 is coupled over lead 628 to an input of counter 630. An 8 MHz clock is coupled over lead 35 to the clock input of counter 630. Signal NHCNTCLR from setup demux and latch 210 is coupled over lead 623 to an input of NAND gate 624. Signal CLRB is coupled over lead 37 to an input of NOR gate 627. The output of NAND gate 624 is coupled over lead 626 to the input of NOR gate 627 having an output coupled over lead 629 to an input of counter 630. Signal range gate is coupled over lead 563 to the inverter input of AND gate 625. The output of counter 630 is coupled over lead 631 to the A input of 2:1 multiplexer 635. The output of multiplexer 635 is coupled over lead 636 to an input of 16-bit latch 637 which has an output on lead 213 to range FIFO memory 42.

Signal range counter preset from setup demux and latch 210 is coupled over lead 632 to the preset input of counter 633. An 8.276 MHz clock is coupled over lead 35 to an input of flip-flop 645, flip-flop 647 and counter 633. The output of flip-flop 645 is coupled over lead 646 to the J input of flip-flop 647 and to the load input of counter 633. Counter 633 has an output coupled over lead 649 to the K input of flip-flop 647. The complement output of flip-flop 647 rollover fault is provided on lead 134. The output of counter 633 is also coupled over lead 634 to the A input of start comparator 638 and the A input of stop comparator 639 as well as the B input of multiplexer 635. Signal target start setup value is coupled over lead 640 to the B input of start comparator 638. Signal target stop set up value is coupled over lead 641 to the B input of stop comparator 639. Start comparator 638 provides an output on lead 642 at times A=B with signal target range start which is coupled to the J input of flip-flop 644. Stop comparator provides signal target range stop at times A=B on lead 643 to the K input of flip-flop 644. The output of flip-flop 644 is signal range gate on lead 563 which is coupled to the control input of multiplexer 635 and the inverted input of AND gate 625. Multiplexer 635 selects A at times the signal on its control input is low and selects B at times the signal on its control input is high.

Referring to FIG. 8, the range counter and reply totalizer section 212 includes a 16-bit range counter 633, magnitude comparators 638 and 639 for target start and stop, a 16-bit reply totalizer counter 630, 2:1 multiplexer 635 to select either range count or reply total for output, output latch 637, and range counter control logic.

The 16-bit range counter 633 is cleared and preset at the beginning of each new interrogation sweep in response to M4ZR on lead 146 in Mode 4, or by SIFZR on lead 36 in ATCRBS/SIF modes. Selection is controlled by Clock Switch (CKSW) 29 and AND gates 610 and 612. At range zero, the next following 8/8.276 MHz clock sets flip-flop 645 so that the second clock will enter a preset value (632), equal to one-half of range cell width, into the four LSBs of range counter 633. Flip-flop 647 is clocked on at the same time, to enable range counter 633 on the third clock following range zero. The range counter 633 is clocked at 8.276 MHz for all modes and configurations so that range data input to Reply Processor 50 will be consistently scaled. Because Mode 4 reply declarations are made at the 8 MHz rate, a ±30 nanosecond ambiguity is unavoidably introduced, which translates to a range accuracy of ±0.0024 nm. Maximum range accommodated by the range counter is 640.5 nm. Maximum range resolution is, of course, the full 16 bits for a range cell width of 121 nanoseconds (where LSB is 1 clk); but only the number of bits, beginning with the MSB, required for a given application will be used. Range cell width and range counter preset 632 value are required to offset range cell center from range counter zero time. This preset value is the 4-bit range resolution value which is user programmed as bits 6 through 9 of setup demux and latch 210 with word No. 1. Range resolution values are provided in Table 3.

TABLE 3

| Range Counter Bits Used | Cell Width in nanosec | Cell Width in nm | Range Counter Preset Value | Delay in nm. |
|---|---|---|---|---|
| 16 (R1-R16) | 121 | .01 | 0 | 0 |
| 15 (R2-R16) | 242 | .02 | 1 | .01 |
| 14 (R3-R16) | 483 | .04 | 2 | .02 |
| 13 (R4-R16) | 967 | .08 | 4 | .04 |
| 12 (R5-R16) | 1933 | .16 | 8 | .08 |

Referring further to FIG. 8, it will be seen that 2:1 multiplexer 635 selects range counter output when Range Gate 563 is active (high) for output to Range FIFO 42. When Range Gate 563 is low, 2:1 multiplexer 635 selects the 16-bit output of reply totalizer 630, which is enabled to increment each time a reply is decoded (either Mode 4 or ATCRBS/SIF). Cumulative reply count can be kept on an interrogation sweep basis, in which case NHCNTCLR setup bit 623 will be high. Then, each RANGE0 will clear the counter; but if NHCNTCLR is held low, count will accumulate until the next RANGE0 after NHCNTCLR is allowed to return high. TRRG (data word No. 2, bit 15) when set, selects counting of only those targets which are in the range gate; when TRRG is clear, all targets are counted.

The target start comparator 638 and target stop comparator 639 are identical 16-bit circuits which compare user-selected range gate data against the running range count to generate Target Range Start 642 and Target Range Stop 643 signals, respectively. These outputs of the range counter section are applied to clocked latch 644 which generates Range Gate 563. When range count becomes equal to the stop value, Range Gate 563 returns low. Range counter 633 is adequate for 640 nautical miles of range, so that rollover should never occur; but if rollover does occur, JK flip-flop 647 will be clocked off to inhibit range counter 633 and to output Roll over Fault (ROFLT) signal 134 to target status word section 138.

Figure 9:
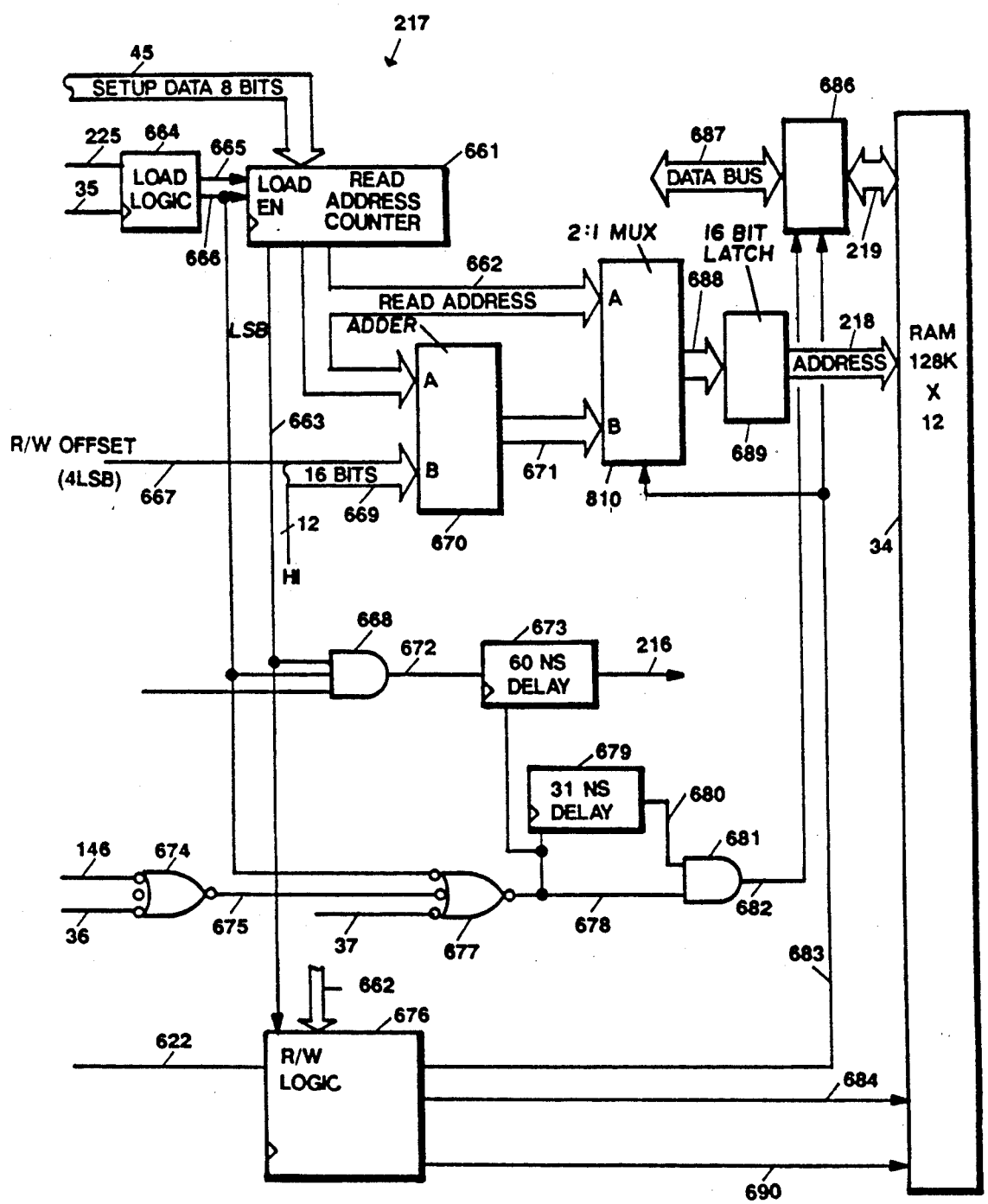
FIG. 9 is a logic diagram of RAM address counter and logic 217.

Referring to FIG. 9, the logic circuitry of RAM address section 217 is shown in more detail. Signal RAM start is coupled over lead 225 to an input of load logic 664 having a first output coupled over lead 665 to the load input of read address counter 661 and a second output coupled over lead 666 to the enable input of read address counter 661 and to an input of AND gate 668 and to an input NOR gate 677. An 8 MHz clock is coupled over lead 35 to the clock input of load logic 664. Setup data on lead 45 which may be, for example, 8 bits, is received from setup FIFO memory 444 and coupled to the data input of read address counter 661. Read address counter 661 has an output to provide the read address which is coupled over lead 662 to the A input of 2:1 multiplexer 810, to the A input of adder 670 and to the R/W logic 676. Signal LSB from read address counter 661 is coupled over lead 63 to an input of AND gate 668 and to an input of R/W logic 676. Signal R/W offset which contains four least significant bits, is coupled over lead 667 to the 4LSB inputs of input B of adder 670. If B input is able to accommodate 16 bits then the 12 higher bits are tied high by way of lead 669.

Referring to FIG. 9, the sum output of adder 670 is coupled over right address bus 671 to the B input of multiplexer 810. The output of multiplexer 810 is coupled over lead 688 to an input of 16 bit latch 689 having an output over lead 218 with signal address to random access memory 34 which may be for example 128 words by 12 bits.

The output of AND gate 668 is coupled over leads 672 through delay 673 which may for example 60 nanoseconds to lead 216 with signal data latch. Signal M4ZR is coupled over lead 146 to an input of NOR gate 674. Signal SIFZR is coupled over lead 36 to an input of NOR gate 674 having an output coupled over lead 675 to an input of NOR gate 677. Signal CLRB is coupled over lead 37 to an input of NOR gate 677 having an output coupled over lead 678 to the input of AND gate 681 and an input of delay 673 and 679. Delay 679 may be for example a 31 nanosecond delay. The output of delay 679 is coupled over lead 680 to a second input of AND gate 681 having an output on lead 682 with signal GATE coupled to the control input of bidirectional bus driver 686. Signal R/W CLRB is coupled over lead 622 to an input of R/W logic 676. An output of R/W logic 676 is coupled over lead 684 with signal R/WB to a control input of RAM 34. A second output of R/W logic 676 is coupled over lead 690 with signal CS to an input of RAM 34. A third output of R/W logic 676 is coupled over lead 683 with signal SELE which is a logic 1 for writing is coupled to bidirectional bus drivers 686. Data from RAM 34 is coupled over bidirectional bus 219 through bus drivers 686 to bidirectional data bus 687.

Referring now to FIG. 9, RAM address section 217 generates read and write addresses for target RAM 34, and control signals for RAM and internal operation. Read address counter 661 functions independently of, but in parallel with, range counter 633 and is clocked at 8 MHz in Mode 4 and 8.276 MHz in ATCRBS/SIF. Actually, counter 661 is a 17-bit counter; the LSB is used only to generate the Data Latch (DL) 216 which latches data read from RAM 34 into target start/stop logic 215. The NLSB toggles at a 2/2.069 MHz rate, allowing sufficient time for read and write operations for each read address count. The counter is loaded with all zeros (except during test) by RAM start 225.

In popup mode, RAM start will go high with Range Gate 563, so that a smaller RAM can be used for popup. If the popup RAM were the same size as recommended for normal operation however, (32k range cells for 640 nm application), then SIF 2-of-n and Mode-4 2-of-n data can be stored without interaction by using the popup bit to select Mode 4 or ATCRBS/SIF. In popup mode, the range GATE is started at a range determined by setup data input, and this range must be consistent for each subsequent interrogation to enable consistent access to stored data.

Referring further to FIG. 9, 16-bit full adder 670 adds the 2's complement value (669) of a programmed setup read/write differential to the read count, so that write address on bus 671 tracks read address on lead 662 but lags by the programmed amount to allow processing time for hit correlation. Writing is inhibited by R/W logic 676 until the read address count increments to 2. R/W logic 676 also generates R/WB on lead 684 to read RAM data when high, and to write into RAM when low. Similarly, SELE signal 683 controls direction of the bidirectional bus drivers 686. These drivers are inhibited by Gate 682 for 31 nanoseconds each time direction is changed. Another 60 nanosecond delay is provided by digital delay 673 before generating Data latch on lead 216 which latches RAM readout data into the target start/stop logic 215. SELE signal on lead 683 also operates 2:1 multiplexer 672 to select read address on lead 662 or write address on lead 671.

Referring further to FIG. 9, read address counter 661 is clocked by 8/8.276 MHz, but the LSB is not used, so Read and Write addresses increment at a 4/4.138 MHz rate. Read address leads the current write address by 4, so that eight 8-MHz clock periods are allowed in which data processing is performed. The 128k byte RAM 34 is organized into four sections of 32k each. One normal or one popup section can be written into while the other RAM section can be read back. Each RAM section provides 12-bit storage at each of the 32k range cells, each of which represents one count of range counter 212. When a reply is decoded, the count window that has been specified for 2-of-n start is entered into the 3 LSBs; thus, if a 2-of-8 criteria has been established for verifying a target, then a 7 will be loaded at the time of the initial hit to indicate the count remaining for the target verification window. This stored count will be decremented one count for each successive sweep.

Figure 10A:
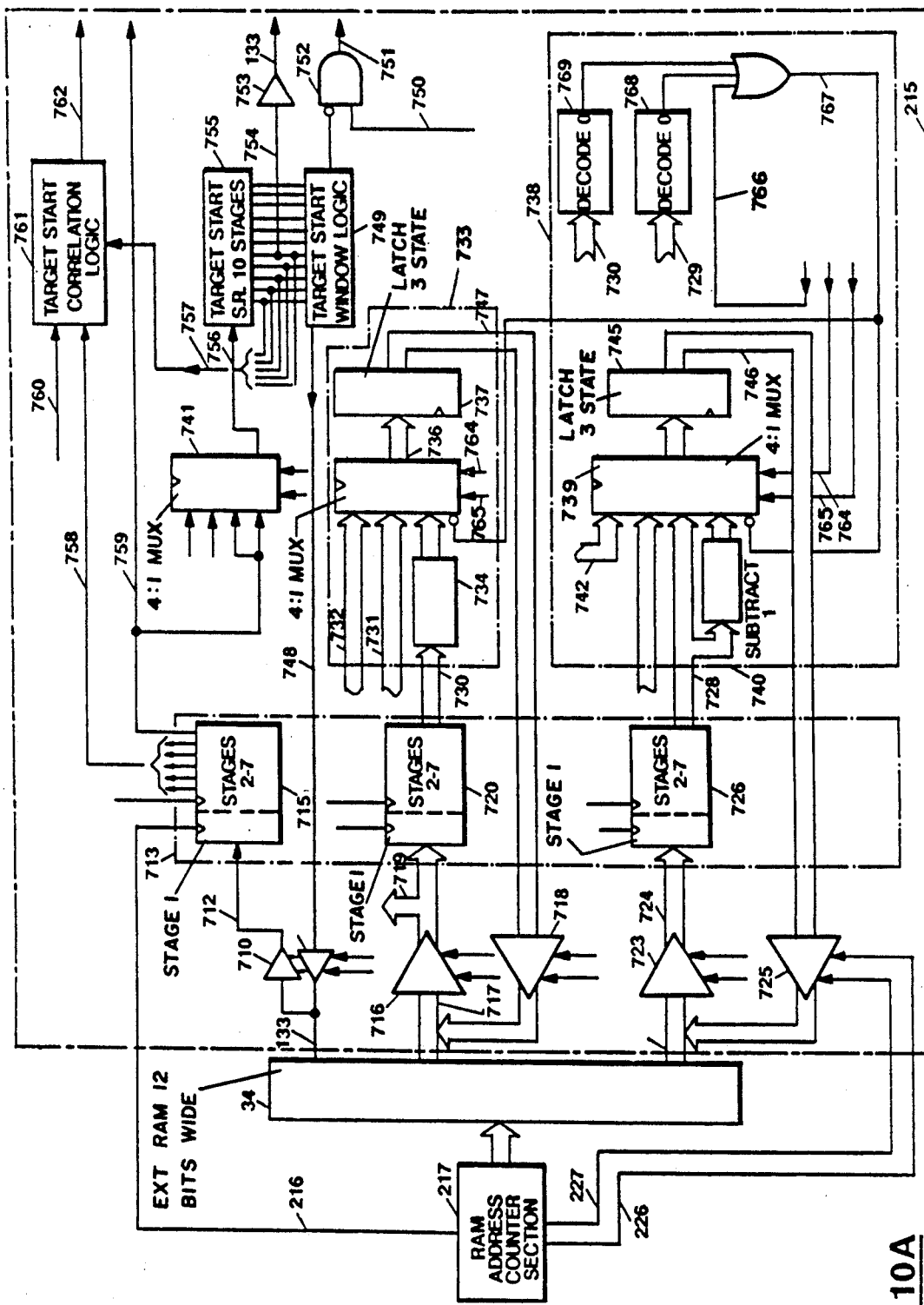
FIGS. 10A and 10B are logic diagrams of target start/stop logic 215.

Referring now to FIG. 10A, start/stop logic section 215 is used both in Mode 4 and in ATCRBS/SIF operation. In Mode 4 operation, start/stop logic is essential; but also, in ATCRBS/SIF modes, when reply rates and FRUIT are unusually high, it is used to perform hardware defruiting in Reply Decoder 30 and thereby avoid overburdening the Reply Processor 50.

Start criteria are determined by inputs to setup demultiplexer and latch 210. In 2-of-n operation, n=hexadecimal value input as bits 11 through 14 of setup word No. 2. Also selectable is 1-of-1 operation, where a single-hit will initiate a Target Start. Stop criteria also are determined by setup inputs, including six bits which preset the nonconsecutive miss (NCM) count, and four bits which preset (at target start time) the consecutive miss (CM) count. Three additional bits determine whether both counts—or which one—is required to disqualify a target and thereby force the range cell data to all zeros.

Referring further to FIG. 10A, data register subsection 713, includes three shift registers 715, 720 and 726 which store target starts, CM count, and NCM count. All three registers 715, 720 and 726 are 7 clocks deep so that data propagating in the priority logic subsection 776 shown in FIG. 10A have reached the register centertaps and will output the A, B, and C control signals at the same time that the related data is exiting the data register subsection. Target start register 715 is 1-bit wide. The n/CM register 720 is 4-bits wide to accommodate the maximum CM count of 15. The NCM counter 726 is 7 bits wide to accommodate the maximum NCM count of 128.

Referring again to FIG. 10A, two similar select logic subsections, identified as Select logic 738 and select 1 logic 733, are shown. These 4:1 data multiplexer sections operate under control of the priority subsection 776 shown in FIG. 10B control signals A on lead 764, B on lead 765, and C on lead 766 to perform switching and 2's complement subtractions to process n/CM and NCM counts in bit-parallel, byte-serial fashion. Output data from these two subsections is latched in 3-state latches 737 and 745, and output is enabled by SELE 683 which toggles the read and write operations.

Select subsection 738 is a 7-bit wide switch which selects either: all 1s, NCM setup value, stored NCM count, stored NCM count−1, or, when Strobe 767 goes high for Target Stop, all 0s will be selected. The "select 1" subsection 733 is a 4-bit wide switch which selects either: n setup value, CM setup value, stored n/CM count−1, or, when Strobe 767 goes high for Target Stop, all zeros will be selected. Both subsections 733 and 738 are inhibited when control signal C is high, or when CM or NCM mode control signals are high. NCM count either can be decremented when a miss occurs, or rewritten into RAM without change when a hit occurs. CM count will either be decremented when a miss occurs, or reset to the programmed value when a hit occurs. When the n/CM portion of RAM is used to store n start criteria for non-started targets during 2-of-n start, select logic will either: decrement the stored value of n when a new hit is not received following a previous first hit; or, when a new hit reinforces a previous first hit, write target stop criteria into RAM 34.

Figure 10B:
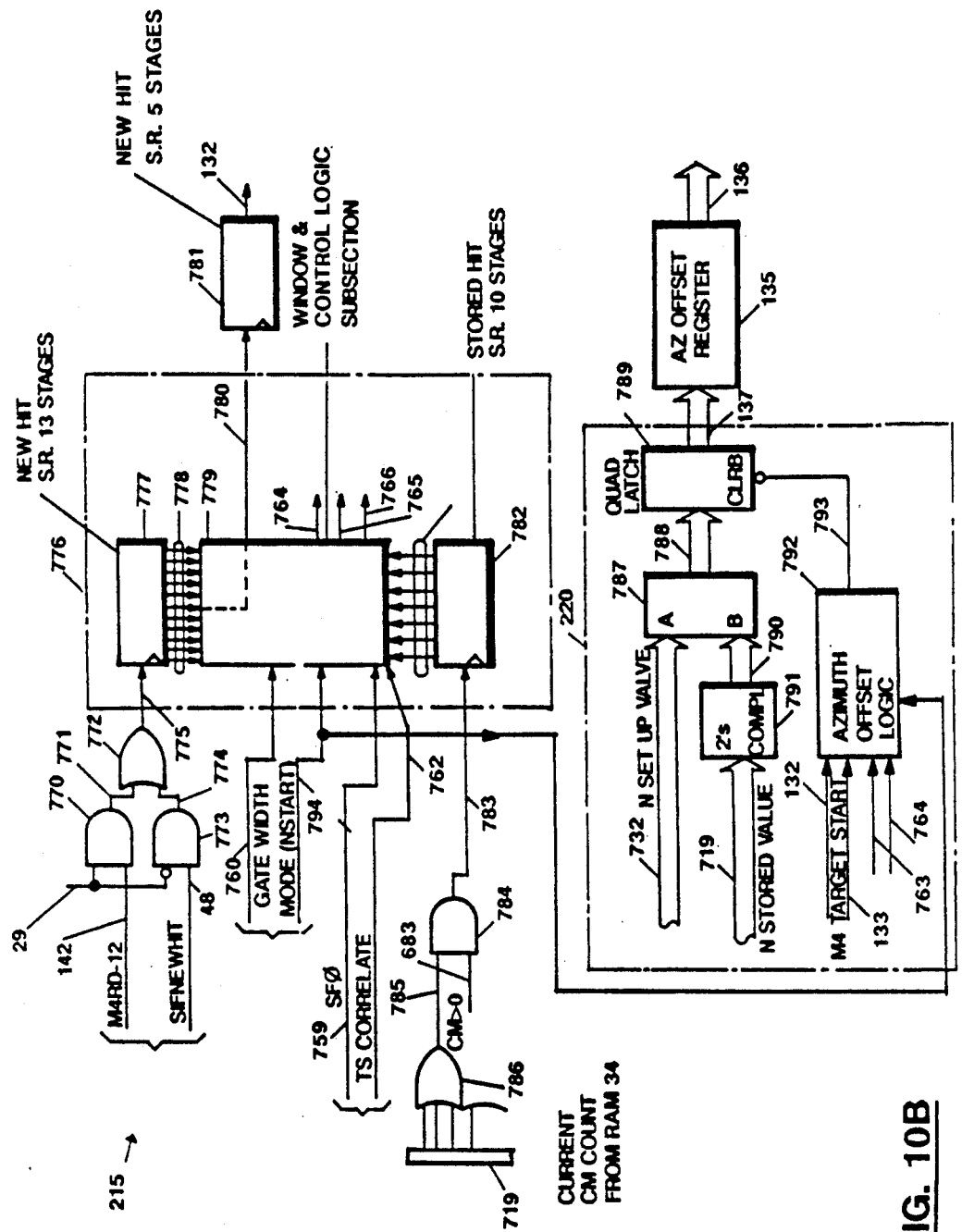

Referring to FIG. 10B, priority subsection 776 receives new hits and propagates them in a 13-stage, 1-bit wide shift register 777. Eleven taps on this register are monitored by window logic 779 to which gate width 760 and start mode 794 control lines are also applied. Similarly, 10-stage stored-hit register 782 has +/−3 taps about the centertap. Window and control logic subsection 779 consists entirely of decoder gates on the window taps of the new hit and stored registers 777 and 782, respectively. Together, these signals determine which logic operation will be performed during each system clock period; they appear at subsection output in time coincidence with the related target data exiting the data register subsection 713.

Reply range gate width, determined by setup inputs, may be 5, 7, 9, or 11 clocks wide. Reply range gate width qualifies target start and also subsequent new hits: i.e., they must fall within the gate to be valid. Narrow range gate width is desirable for optimal range resolution in ATCRBS/SIF applications where reply time jitter is minimal; typically, a 5-clock-wide gate is used. In Mode 4 applications however, and especially where either the Interrogator Processor 25 performs the 3-pulse reply decoding, and/or the KIR cryptograph computer is not directly connected to the Reply Decoder 30, reply time jitter can be as much as ±0.5 microseconds. In such applications, wider range gate width is necessary to avoid exclusion of valid replies, as range gate width establishes the "look" window for subsequent replies. Referring further to FIG. 10B, the number of new hit register 777 taps 778 and stored hit register 782 taps 765 actually in use is determined by the currently established gate width, as tabulated in Table 4 for range correlation of new and stored hits table.

TABLE 4

| Gate Width | New Hit Taps Used | Stored Hit Taps Used |
|---|---|---|
| 5 | +/− 2 | +/− 1 |
| 7 | +/− 3 | +/− 2 |
| 9 | +/− 4 | +/− 2 |
| 11 | +/− 5 | +/− 3 |

Referring further to FIG. 10B, priority logic 776 compares new hit and stored hit data present in these two windows to configure target start/stop logic 21 for performing the needed operation. Priority logic thus determines whether each of two stored counts will be decremented, rewritten into RAM 34, or reset to zero. Setup data to Start Mode input 794 will determine whether start criteria is 1-of-1 mode (where the target start flag will be set true with a first hit), or 2-of-n mode where the programmed n−1 value will be stored in lieu of the CM count until target start; then, on the next interrogation sweep, any new hit that passes through the window will cause a target start. Target start range will be at the mean position of the stored hit and the new hit. When 2-of-n start has been programmed, the programmed value of n−1 (4 bits) will be written into RAM 34 by the first hit to indicate the number of hits remaining within which to find a second hit. Then, each subsequent interrogation will decrement this count until at zero count, if not reinforced by another new hit, the first hit window will be discarded. Conversely, a reinforcing new hit within the first hit window will set the Target Start flag, then CM stop criteria will be loaded into these four bits of RAM. The target start then establishes a gate window which is equal in width to the reply range gate width. No other target start can begin in the established window, but each new hit that passes through the window will reinforce the existing target start flag, which is bit RD01 in RAM. Once a target start occurs, it will remain in the same range cell until stop criteria have been met. Range position in this application is not averaged between target start and each successive new hit. Although such an averaging scheme could be used to appropriately move the target's location by means of a different set of logic in the Priority Subsection 776.

Referring again to FIG. 10B, priority logic subsection 776 uses signals derived by these register taps to generate logic control signals A on lead 764, B on lead 765, and C on lead 766. These control signals determine which logic operation will be performed on the stored data by the select logic subsections 733 and 738, FIG. 10A to select one of four possible operations. The C output 766 indicates that all zeros are to be stored. In order to cover all situations that require an output of all zeros, C output is logically ORed with outputs of decoders 768 and 769 to detect the all-zeros condition following some nonzero value. This operation allows zero to be a stored number before it is acted upon, so that up to 16 loops can occur for a 4-bit binary number. The tables below show logic operations performed for n hits vs consecutive miss count, nonconsecutive miss count, and target start flag. 2-of-n Start (n)/Consecutive Miss (CM) Count is shown in Table 5, and Nonconsecutive Miss (NCM) Count is shown in Table 6.

TABLE 5

| Control signals: | | | |
|---|---|---|---|
| C | B | A | Logic Operation |
| 0 | 0 | 0 | First hit; write n start criteria. Value = n-1. |
| 0 | 0 | 1 | New start; write CM stop criteria. Value = CM-1. |
| 0 | 1 | 0 | Old start, new hit; write CM stop criteria. Value = CM-1. |
| 0 | 1 | 1 | No new hit; write current stored value −1. |
| 1 | x | x | Write all zeros. |

TABLE 6

| Control: | | | |
|---|---|---|---|
| C | B | A | Logic Operation |
| 0 | 0 | 0 | First hit; write all 1s. |
| 0 | 0 | 1 | New start; write NCM stop criteria. Value = NCM-1. |
| 0 | 1 | 0 | Old start, new hit; rewrite current NCM value. |
| 0 | 1 | 1 | No new hit; write current stored value −1. |
| 1 | x | x | Write all zeros. |

Target Start (TS) Flag Table is shown in Table 7.

TABLE 7

| Control Signals: | | | |
|---|---|---|---|
| C | B | A | Logic Operation |
| 0 | 0 | 0 | First hit; output TS = 0 |
| 0 | 0 | 1 | New start; TS = 1. |
| 0 | 1 | 0 | Old start, new hit; TS = 1. |
| 0 | 1 | 1 | No new hit; write current value of TS. |
| 1 | x | x | Write all zeros. |

Each new bit must be compared against the reply range window established by previously stored first hits and Target Starts (TS) to determine which one of the following conditions exists:

a. New hit is a first hit, which meets target start criteria in 1-of-1 mode only.
b. New hit is a second or subsequent hit, which meets target start criteria in 2-of-n mode per setup value of n.
c. No new hit but previous first hit: decrement n count.
d. No new hit but previous target start: decrement NCM and CM.

Logic implemented in the priority subsection obeys the following rules:

a. In 2-of-n mode, new hits only combine with previous first hits within the specified range gate width to initiate a new target start.
b. In 1-of-1 mode, a new hit will initiate a new target start if there had been no previous first hit.
c. A new start will be placed at the average position of the new hit and the previous first hit—unless that placement should place it in the range gate window of another target start, in which case only a first hit flag will be set for the new hit's range cell.
d. New start average positions are weighted toward the new hit if position is not an exact cell location.
e. New hits also store to the present range cell location as a first hit if there is not a target start in the cell, even if the new kit has also combined with a previous first hit to generate a new target start.
f. Once stored as a first hit, new hits for unstarted targets stay in the same cell.
g. New hits and previous target starts associate without restriction to permit the ne hit to validate the previous target starts.
h. Once started, target starts stay in the same cell.

New hits do not occur in adjacent cells—due to present implementation of the present video quantizer and Leading Edge Detector 28, which does not generate leading edges with less than two-clock separation.

FIG. 10B also shows azimuth offset section 220, where the difference between (n) setup value and current (n) stored value is determined by 2's complement subtraction in adder 787. This value represents the number of interrogations between first hit and target start. Actual azimuth data bytes are passed to the associated FIFO via interface circuitry 33. Azimuth offset section 220 could also be used to read out the number of interrogations between any two reinforcing hits. The 4-bit difference 788 is latched in 789 and delayed four clocks in azimuth offset register 135 (in DV chip) before being latched with the remaining bits of the target status word as shown in FIG. 7.

One of the features of the present invention is that many parameters of reply decoder 30 are user-programmable. Although this user-programmable feature is not new in principle, it is described here to facilitate comprehension of Reply Decoder operation. The particular features implemented greatly expand the functionality and operation of the invention. Referring to FIG. 1, it will be seen that setup demultiplexer and latch 210 receives 16-bit data words from the Reply Processor 50, via setup FIFO memory 44, and stores the user-selectable parameters conveyed by these words. A FIFO memory is not mandatory: other means could be used to queue and input setup data. The format of presently used setup words is tabulated below. There are no setup default values: all used bits must be initialized on power-up; however, data to be changed can be written into the addressed register over existing data; so, only data requiring change need be reentered for each new setup. Data storage registers for the setup words are addressed by two select line inputs, and are written into by a data strobe from setup FIFO memory. Setup demux and latch 210 includes two sets of registers for target start and stop ranges. Other data for popup operation (i.e., n, CM, NCM, gate width, mode select, and power-up bit) use the same register which are used for normal operation. Setup Data Word No. 1 on lead 45 and Format is shown in Table 8.

TABLE 8

| Bit | Mnemonic | Function |
|---|---|---|
| 0-2 | STOPMODE | Determines whether a zero value of NCM count, CM count, or both will disqualify a target and force the output to all 0s. The octal codes are:<br>100 = both NCM and CM<br>010 = only NCM<br>001 - only CM |
| 3-5 | Gate Width | Determines gate width in clocks, where CW1,2,3 are:<br>000 = 5 clocks (center +/−2)<br>100 = 7 clocks (center +/−3)<br>110 = 9 clocks (center +/−4)<br>111 = 11 clocks (center +/−5) |
| 6-9 | Range Resolution | Determines range counter offset delay for range resolution setup as follows:<br>0000 = 8.276 MHz, 121 nsec<br>0001 = 4.14 MHz, 242 nsec<br>0010 = 2.07 MHz, 483 nsec<br>0100 = 1.04 MHz, 967 nsec<br>1000 = 0.517 MHz, 1933 nsec |
| 10 | NHCNTCLR | When set, this pin allows range zero to clear the total reply counter so that total reply count is per interrogation sweep. Otherwise, the counter is not cleared but continues to count continuously with a rollover at count 65536, so total reply count is cumulative. |
| 11 | (Not used.) | |
| 12 | MODE | When clear, (0), selects 2-of-n start mode; when set (1), selects 1-of-1 start mode. |
| 13 | SOR4 | When low, forces SIFEN low to enable software defruiting of ATCRBS/SIF replies. When high, enables hardware defruiting of ATCRBS/SIF replies. |
| 14 | POPUP | When set (logic 1), next interrogation will be a popup |
| 15 | POWERUP | Used for power-up or mode change. When clear (logic 0), data propagated out of RAM is discarded in first stages of n/CM, NCM, and TS registers, thereby effectively clearing the previously stored register |

TABLE 8-continued

| Bit | Mnemonic | Function |
|---|---|---|
| | | information. |

Setup, Data Word No. 2 Format on lead 45 is shown in Table 9.

TABLE 9

| Bit | Mnemonic | Function |
|---|---|---|
| 0-6 | NCM | Sets initial NCM count. Value to be entered is NCM-1. |
| 7-10 | CM | Sets initial CM count. Value to be entered is CM-1. |
| 11-14 | N | Sets value of n for 2-of-n target starts. Value to be entered in n-1. |
| 15 | TRRG | When set (1), total reply counter will count only replies in the range gate; when clear (0), all replies are counted. |

Set up, Data Word No. 3 on lead 45 and Format is shown in Table 10.

TABLE 10

| Bit | Mnemonic | Function |
|---|---|---|
| 0-15 | Target Start Range | Range value for target start range gate, normal or popup target. LSB = .01 nmile |

Setup, Data Word No. 4 on lead 45 and Format is shown in Table 11.

TABLE 11

| Bit | Mnemonic | Function |
|---|---|---|
| 0-15 | Target Stop Range | Range value for target stop range gate, normal or popup target. LSB = .01 nmile |

Referring again to FIG. 1, it will be seen that, in addition to the above setup inputs from setup FIFO memory 44, other setup parameters are input to setup latch 145. Presently, one 16-bit word is used as shown in the table below. This setup word is latched by the Data Load Strobe (DSTB) input. In addition to this word, there are seven "hardwired" static setup inputs, including the NDIRCT configuration control and a 6-bit Range Counter Delay Preset.

Setup Word Format is shown in Table 12.

TABLE 12

| Bit | Mnemonic | Function | | | |
|---|---|---|---|---|---|
| 0-3 | RDSC0-3 | Railing Decode Select Criteria. A 4-bit code which specifies the number of possible reply positions which are to be analyzed by the railing detection logic. Two decoding criteria are selectable: N replies of N possible positions (when RDSC3 = 1); or, N-2 replies out of N possible positions (when RDSC3 = 0). Values are as follows: | | | |
| | RDSC3 | RDSC2 | RDSC1 | RDSC0 | Criteria |
| | 0 | 1 | 1 | 1 | 2 of 4 |
| | 0 | 1 | 1 | 0 | 3 of 5 |
| | 0 | 1 | 0 | 1 | 4 of 6 |
| | 0 | 1 | 0 | 0 | 5 of 7 |
| | 0 | 0 | 1 | 1 | 6 of 8 |
| | 0 | 0 | 1 | 0 | 7 of 9 |

TABLE 12-continued

| | | | | |
|---|---|---|---|---|
| 0 | 0 | 0 | 1 | 8 of 10 |
| 0 | 0 | 0 | 0 | Not used. |
| 1 | 1 | 1 | 1 | 4 of 4 |
| 1 | 1 | 1 | 0 | 5 of 5 |
| 1 | 1 | 0 | 1 | 6 of 6 |
| 1 | 1 | 0 | 0 | 7 of 7 |
| 1 | 0 | 1 | 1 | 8 of 8 |
| 1 | 0 | 1 | 0 | 9 of 9 |
| 1 | 0 | 0 | 1 | 10 of 10 |
| 1 | 0 | 0 | 0 | Not used. |

| Bit | Mnemonic | Function |
|---|---|---|
| 4-5 | RGW0 & 1 | Railing Gate Width. A 2-bit code selects gate width for railing logic to be 3, 5, 7, or 9 clocks wide as follows. (Railing gates are centered at 1.75 microsecond intervals.) |

| RGW1 | RGW0 | Gate Width (in Clocks) |
|---|---|---|
| 1 | 1 | 3 |
| 1 | 0 | 5 |
| 0 | 1 | 7 |
| 0 | 0 | 9 |

| Bit | Mnemonic | Function |
|---|---|---|
| 6-8 | DVGW0 - 2 | Density Value Gate Width. A 3-bit code selects gate width for the density value computation to be, 5, 7, 9, or 11 CLKs wide as follows: |

| DVGW2 | DVGW1 | DVGW0 | Gate Width (CLKs) |
|---|---|---|---|
| 1 | 1 | 1 | 5 |
| 1 | 1 | 0 | 7 |
| 1 | 0 | 0 | 9 |
| 0 | 0 | 0 | 11 |

| Bit | Mnemonic | Function |
|---|---|---|
| 9 | 5EN | Enable 5-wide gate. When input to DV chip is true (L), 5-wide gate is used for 3-pulse decoder logic. When input is false (H), the standard 3-mode gate is used. |
| 10 | RAILEN | When input to DV chip is true (H), railing detector output is enabled to inhibit output. |

Referring now to FIG. 11, a first alternate embodiment of the invention is shown where the KIR Cryptographic Computer 25 is connected to the Interrogator 10 and thus indirectly to the reply decoder 30 of this invention, rather than connected directly to the reply decoder 30 as shown in FIG. 1. This system configuration is the conventional one used with previous Reply Decoders. The INDRCT configuration control input 49, to which a logic high is applied, is effectively passed through retiming logic 114 as the FOUND signal 115, and also enables a stationary DV window about reply position 8. GTC and TDV inputs are not used. In the KIR indirect connection of FIG. 11 the sequence of system operation is as follows:

a. The effect of having a fixed evaluation window at reply position 8 is to add 32 microseconds to the KIT+KIR delay time, plus the 18.75 microsecond delay incurred in shift register 112. This pre-enables fixed windows at the center reply position for railing and QB taps, while enabling the eighth DV tap as being the assumed correct position.
  b. Mode 4 Pretrigger (M4PT) 24 is output to KIR Crypto Encoder 27 by Interface Board 33 to initiate Interrogation sweep start.
  c. Crypto Encoder 27 sends KIRCV 23 to Interrogator Transmitter 16, and KIRGTC 22 to Interrogator Receiver 19.
  d. In indirect configuration, INDIRECT 49 (control input) will be logic-high to disable the 3-pulse decode circuit in LED. Three-pulse Decoded Replies M43PD on lead 199 from Interrogator Receiver 19 are applied to KIR Crytpo Delay 26, which imposes the correct delay and outputs Time Decoded Video (KIRTDV) on lead 21 to the associated Quantizer and Leading Edge Detector 28.
  e. Video Quantizer (part of 28, FIG. 11) passes the 3-pulse decoded reply onto the composite video input of LED 28 (part of 28, FIG. 11) which outputs a single leading-edge detected pulse on the M4DR on lead 110. Reply decoding then proceeds as previously described, but without the floating evaluation window as provided in FIGS. 1 and 3.

A second alternate embodiment would differ from the preferred embodiment only in that two Synchronizer chips 32 and 32' of the same type and with the same function as 32 shown in FIG. 11 would be used. The second Synchronizer chip 32' is designed with a separate configuration input Odd-or-Even (ODE) 49 which makes this possible. The two Synchronizer chips 32 and 32' operate with the external RAM 34 in a time-sharing scheme. This permits a 2:1 improvement in Range resolution since targets can be detected and stored each ⅛ microsecond rather than each ¼ microsecond as with a single synchronizer chip 32. Read address counter 661 is enabled on an 8 MHz clock phase determined by the State of ODE input. For 2-chip operation, the two chips are alternately enabled: SELE control lines (683, FIG. 9) for the two chips are 180 degrees out-of-phase for mutually exclusive odd/even operation. Chip No. 1 is considered to be the "even" chip (ODE=L), and starts incrementing at M4ZR 146 for Mode 4 or SIFZR 36 for ATCRBS/SIF modes. The "odd" chip (ODE=H) is enabled one clock after the even chip. In this manner, the quiescent space of one chip is interleaved with the active period of the other.

What is claimed is:

1. In an Identification Friend or Foe system having an interrogator and a transponder,
  said interrogator including a KIR computer providing a cryptographic mode 4 interrogation signal specifying a particular delay between the time of reception of the interrogation signal by the transponder and the transmission of a reply by the transponder,
  said particular delay being selected from among a predetermined number of delays,
  said transponder including a KIT computer for decoding said cryptographic interrogation signal to determine said particular delay to be imposed by said transponder prior to transmitting a mode 4 reply signal,
  said mode 4 reply signal being characterized by a specific number of pulses having a specific pulse spacing:
  apparatus for identifying valid mode 4 replies received from a transponder which have said particular delay specified by said KIR computer and for determining the range from said interrogator to said transponder comprising:
  first means for storing said mode 4 reply signals as a function of time of reception following transmission of said interrogation signal, second means for determining said particular delay specified by said KIR cryptographic computer delay and for adding a complimentary delay to said received replies, said complimentary delay being the difference between said particular delay and said predetermined number of delays, third means for providing range as a function of time coupled to said second means said third means determining the range between said interrogator and the transponder transmitting reply signals having said particular delay be measuring the time between transmission of said interrogation signals and the appearance of said complimented received replies, and p1 fourth means coupled to said first means for providing a background density value for evaluating the validity of said received replies having said particular delay, said background density value being the number of said mode 4 replies received by said interrogator having delay times other than said particular delay. received replies, and fourth means coupled to said first means for providing a background density value for evaluating the validity of said received replies having said particular delay, 2. The apparatus of claim 1 wherein said first means includes a shift register having a plurality of taps and means for clocking said shift register at a predetermined clock rate to move said stored mode 4 replies down said shift register.

3. The apparatus of claim 1, wherein said mode 4 reply signal is characterized by three equally spaced pulses, further comprising fifth means for generating a decode pulse positioned in time with the leading edge of the last received pulse of a said three pulse mode 4 reply and means for coupling said each said decode pulse to said first means as said mode 4 replies to be stored.

4. The apparatus of claim 3 further including: railing detector means coupled to said first means, said railing detector means detecting a string of adjacent decode pulses spaced apart by the same time interval as the time between the leading pulse and the trailing pulse of said three pulse mode 4 reply signal.

5. The apparatus of claim 4 wherein said railing detector means includes:
a shift register for receiving decode pulses from said first means; and
logic circuitry for blurring the time position of said decode pulses by means of ORing adjacent stages of said shift register together.

6. The apparatus of claim 5 wherein said railing detector means further includes:
means for summing the number of adjacent decode pulses detected by said railing detector means during a predetermined interval; and
means for generating a railing signal whenever the sum of said adjacent decode pulses is equal to of greater than a predetermined value, said railing signal being indicative of the invalidity of said mode 4 replies.

7. The apparatus of claim 6 further including: means for inhibiting said third means for providing range whenever said railing detector means generates said railing signal.

8. The apparatus of claim 7 wherein:
said means for inhibiting said third means includes means for inhibiting said third means for a selected number of successive interpulse periods following the appearance of said railing signal,
said interpulse period being the interval between the transmission of successive interrogation signals by said interrogator.

9. The apparatus of claim 8 wherein said selected number of interpulse periods during which said third means is inhibited is decremented for each successive interpulse period during which said railing signal is absent and wherein said selected number is reset to its initial value for each said interpulse period during which said railing signal is present.

10. The apparatus of claim 3 further including fifth means for determining whether two said mode 4 replies are overlapped in time and for inhibiting said third means whenever said two mode 4 replies are overlapped.

11. The apparatus of claim 1 wherein said interrogator includes:
a receiver for receiving mode 4 reply signals from a transponder;
means for generating a gain time control signal for controlling the gain of said receiver as a function of time;
said receiver being inoperative to receive mode 4 reply signals until the beginning of said gain time control signal,
and wherein said second means includes:
means for applying said gain time control signal to said KIR computer;
means in said KIR computer for delaying said gain time control signal an amount equal to said particular delay to provide a time decoded video signal, and
means for counting the time from the application of said gain time control signal to said KIR computer until the appearance of said time decoded video signal,
the output of said time counting means being equal to said particular delay specified by said KIR computer.

12. The apparatus of claim 10 wherein said fifth means for determining whether two said mode 4 replies are overlapped in time includes:
a shift register having a sufficient number of stages to contain two pulses spaced apart an amount equal to two and one-fourth of the spacing between said mode 4 pulses;
means for applying said decode pulses stored in said first means to said shift register; and
logic means coupled to the initial one-eighth of said shift register stages and to the final one-eighth of said shift register stages for inhibiting said third means for determining range whenever pulses are simultaneously present in any one of said initial one-eighth of said shift register stages and in any one said final one-eighth of said shift register stages.

13. The apparatus of claim 3 wherein said fourth means providing a background density value includes:
means providing the sum of the decode pulses stored in said first means at times corresponding to other than the time corresponding to said particular delay.

* * * * *